US012811728B2

(12) United States Patent
Shariatmadari et al.

(10) Patent No.: US 12,811,728 B2
(45) Date of Patent: Nov. 24, 2026

(54) USER EQUIPMENT, SCHEDULING NODE, METHOD FOR USER EQUIPMENT, AND METHOD FOR SCHEDULING NODE

(71) Applicant: Panasonic Intellectual Property Corporation of America, Torrance, CA (US)

(72) Inventors: Hamidreza Shariatmadari, Langen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 292 days.

(21) Appl. No.: 18/696,681

(22) PCT Filed: Sep. 20, 2022

(86) PCT No.: PCT/EP2022/076019
§ 371 (c)(1),
(2) Date: Mar. 28, 2024

(87) PCT Pub. No.: WO2023/052181
PCT Pub. Date: Apr. 6, 2023

(65) Prior Publication Data

US 2024/0388387 A1 Nov. 21, 2024

(30) Foreign Application Priority Data

Oct. 1, 2021 (EP) .................................... 21200584

(51) Int. Cl.
*H04L 1/1829* (2023.01)
*H04W 72/0446* (2023.01)
(Continued)

(52) U.S. Cl.
CPC .......... *H04L 1/1858* (2013.01); *H04L 1/1848* (2013.01); *H04W 72/0446* (2013.01); *H04W 72/11* (2023.01); *H04W 72/21* (2023.01)

(58) Field of Classification Search
CPC ....... H04L 5/00; H04L 1/1607; H04L 1/1854; H04L 1/1861; H04W 72/12; H04W 72/232; H04W 72/11
See application file for complete search history.

(56) References Cited

U.S. PATENT DOCUMENTS

2020/0228248 A1 7/2020 Islam et al.
2020/0413425 A1 12/2020 Lin et al.
(Continued)

FOREIGN PATENT DOCUMENTS

WO WO 2020156450 A1 8/2020

OTHER PUBLICATIONS

3GPP, "3rd Generation Partnership Project; Technical Specification Group Radio Access Network; NR; Physical channels and modulation (Release 15)," 3GPP TS 38.211 v15.7.0, Sep. 2019. (97 pages).

(Continued)

*Primary Examiner* — Iqbal Zaidi
(74) *Attorney, Agent, or Firm* — Seed Intellectual Property Law Group LLP

(57) ABSTRACT

The present disclosure relates to a user equipment, UE, comprising the following. A processing circuitry of the UE determines, based on a Semi-Persistent Scheduling (SPS) configuration, an initial transmission opportunity and at least one repetitive transmission opportunity for an acknowledgement information. The processing circuitry further determines a Uplink Control Information (UCI) transmission opportunity for transmitting UCI. The processing circuitry further determines, if the UCI transmission opportunity is
(Continued)

not available, a target transmission opportunity. A transceiver circuitry uses the target transmission opportunity for transmitting the acknowledgment information.

20 Claims, 12 Drawing Sheets

(51) Int. Cl.
*H04W 72/11* (2023.01)
*H04W 72/21* (2023.01)

(56) References Cited

U.S. PATENT DOCUMENTS

| | | | | |
|---|---|---|---|---|
| 2021/0226759 | A1* | 7/2021 | Takeda | H04L 1/1887 |
| 2021/0352674 | A1* | 11/2021 | Taherzadeh Boroujeni | H04L 5/0058 |
| 2023/0396391 | A1* | 12/2023 | Zhang | H04L 1/1854 |

OTHER PUBLICATIONS

3GPP, "3rd Generation Partnership Project; Technical Specification Group Radio Access Network; NR; Physical channels and modulation (Release 16)," 3GPP TS 38.211 v16.2.0, Jun. 2020. (131 pages).

3GPP, "3rd Generation Partnership Project; Technical Specification Group Radio Access Network; NR; Physical channels and modulation (Release 16)," 3GPP TS 38.211 v16.7.0, Sep. 2021. (134 pages).

3GPP, "3rd Generation Partnership Project; Technical Specification Group Radio Access Network; NR; Multiplexing and channel coding (Release 16)," 3GPP TS 38.212 v16.7.0, Sep. 2021. (153 pages).

3GPP, "3rd Generation Partnership Project; Technical Specification Group Radio Access Network; NR; Physical layer procedures for control (Release 16)," 3GPP TS 38.213 v16.7.0, Sep. 2021. (188 pages).

3GPP, "3rd Generation Partnership Project; Technical Specification Group Radio Access Network; NR; Physical layer procedures for data (Release 16)," 3GPP TS 38.214 v16.7.0, Sep. 2021. (172 pages).

3GPP, "3rd Generation Partnership Project; Technical Specification Group Radio Access Network; NR; NR and NG-RAN Overall Description; Stage 2 (Release 15)," 3GPP TS 38.300 v15.6.0, Jun. 2019. (99 pages).

3GPP, "3rd Generation Partnership Project; Technical Specification Group Radio Access Network; NR; Physical layer procedures for control (Release 15)," 3GPP TS 38.213 v15.3.0, Sep. 2018. (101 pages).

3GPP, "3rd Generation Partnership Project; Technical Specification Group Radio Access Network; NR; NR and NG-RAN Overall Description; Stage 2 (Release 15)," 3GPP TS 38.300 v16.7.0, Sep. 2021. (152 pages).

3GPP, 3rd Generation Partnership Project; Technical Specification Group Radio Access Network; Study on Scenarios and Requirements for Next Generation Access Technologies (Release 16), 3GPP TR 38.913 v16.0.0, Jul. 2020. (40 Pages).

3GPP, "3rd Generation Partnership Project; Technical Specification Group Services and System Aspects; System Architecture for the 5G System; Stage 2 (Release 16)," 3GPP TS 23.501 v16.1.0, Jun. 2019. (368 pages).

Extended European Search report, mailed Mar. 9, 2022, for European Application No. 21200584.7-1231, 8 pages.

International Search Report, mailed Jan. 12, 2023, for International Application No. PCT/EP2022/076019, 4 pages.

ITU, "IMT Vision—Framework and overall objectives of the future development of IMT for 2020 and beyond," Recommendation ITU-R M.2083-0, Sep. 2015. (21 pages).

Xiaomi, "HARQ-ACK feedback enhancement for URLLC/IIoT," R1-2007900, Agenda Item: 8.3.1.1, 3GPP TSG RAN WG1 #103, e-Meeting, Oct. 26-Nov. 13, 2020, 3 pages.

* cited by examiner

USER EQUIPMENT, SCHEDULING NODE, METHOD FOR USER EQUIPMENT, AND METHOD FOR SCHEDULING NODE

BACKGROUND

1. Technical Field

The present disclosure relates to transmission and reception of signals in a communication system. In particular, the present disclosure relates to methods and apparatuses for such transmission and reception.

2. Description of the Related Art

The 3rd Generation Partnership Project (3GPP) works at technical specifications for the next generation cellular technology, which is also called fifth generation (5G) including "New Radio" (NR) radio access technology (RAT), which operates in frequency ranges up to 100 GHz. The NR is a follower of the technology represented by Long Term Evolution (LTE) and LTE Advanced (LTE-A).

For systems like LTE and NR, further improvements and options may facilitate efficient operation of the communication system as well as particular devices pertaining to the system.

SUMMARY

One non-limiting and exemplary embodiment facilitates efficient usage of transmission opportunities for transmission of Uplink Control Information (UCI).

In an embodiment, the techniques disclosed here feature an apparatus (e.g. a user equipment, UE). The apparatus comprises circuitry which, in operation, determines, based on a Semi-Persistent Scheduling, SPS, configuration, an initial transmission opportunity and at least one repetitive transmission opportunity for an acknowledgement information. Further, the circuitry determines a Uplink Control Information, UCI, transmission opportunity for transmitting UCI. Further, the circuitry determines, if the UCI transmission opportunity is not available, a target transmission opportunity; Furthermore, the apparatus comprises a transceiver which, in operation, uses the target transmission opportunity for transmitting the acknowledgment information.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

DETAILED DESCRIPTION

5G NR System Architecture and Protocol Stacks

3GPP has been working at the next release for the 5th generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
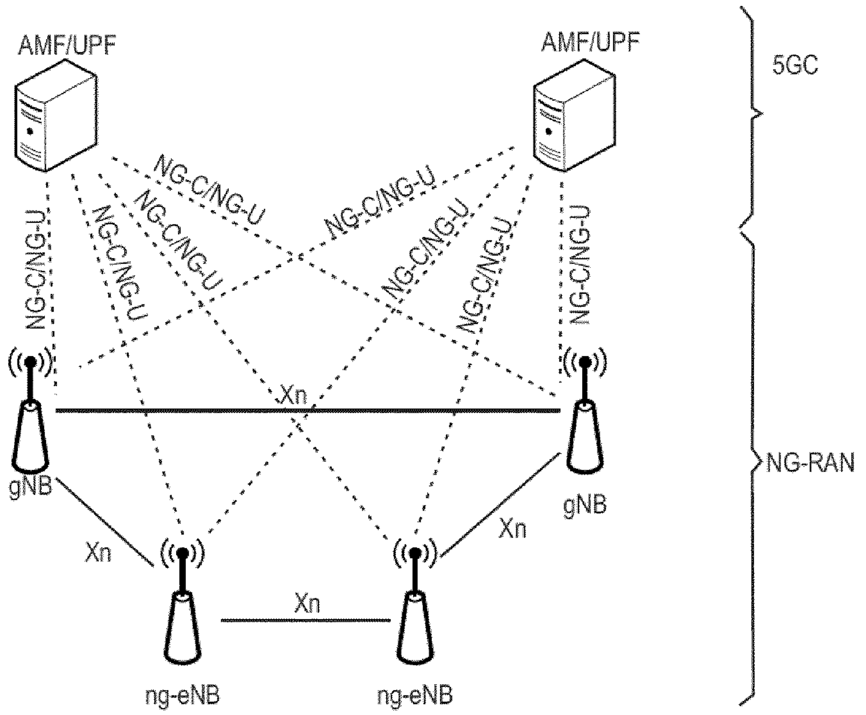
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g. a particular core entity performing the AMF) by means of the NG-C interface and to the UPF (User Plane Function) (e.g. a particular core entity performing the UPF) by means of the NG-U interface. The NG-RAN architecture is illustrated in FIG. 1 (see e.g. 3GPP TS 38.300 v15.6.0, section 4).

The user plane protocol stack for NR (see e.g. 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see e.g. sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability ($1\text{-}10^{-5}$ within 1 ms). Finally, mMTC may preferably require high connection density (1,000,000 devices/$km^2$ in an urban environment), large coverage in harsh environments, and extremely long-life battery for low cost devices (15 years).

Therefore, the OFDM numerology (e.g. subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f=1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v16.2.0, e.g. section 4). For instance, downlink and uplink transmissions are organized into frames with 10 ms duration, each frame consisting of ten subframes of respectively 1 ms duration. In 5G NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprises of 14 OFDM symbols.

Comparing to LTE numerology (subcarrier spacing and symbol length), NR supports multiple different types of subcarrier spacing, labeled by a parameter $\mu$ (in LTE there is only a 15 kHz subcarrier spacing, corresponding to $\mu=0$ in NR). The types NR numerology is summarized in 3GPP TS 38.211, v 15.7.0.

5G NR Functional Split Between NG-RAN and 5GC

Figure 2:
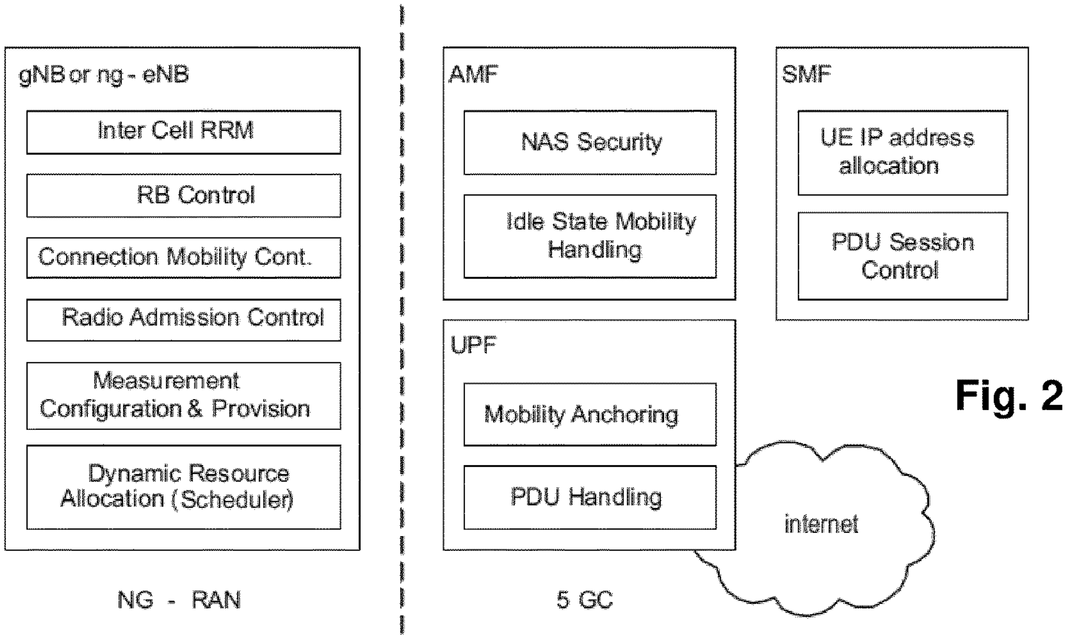
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:

- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:

Non-Access Stratum, NAS, signalling termination;
NAS signalling security;
Access Stratum, AS, Security control;
Inter Core Network, CN, node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.

Furthermore, the User Plane Function, UPF, hosts the following main functions:

Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g. packet filtering, gating, UL/DL rate enforcement;
Uplink Traffic verification (SDF to QoS flow mapping);
Downlink packet buffering and downlink data notification triggering.

Finally, the Session Management function, SMF, hosts the following main functions:

Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
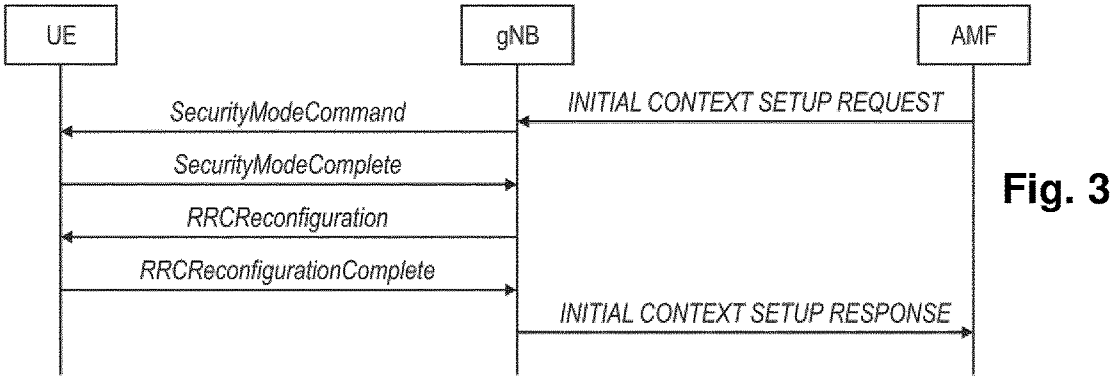
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including e.g. PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
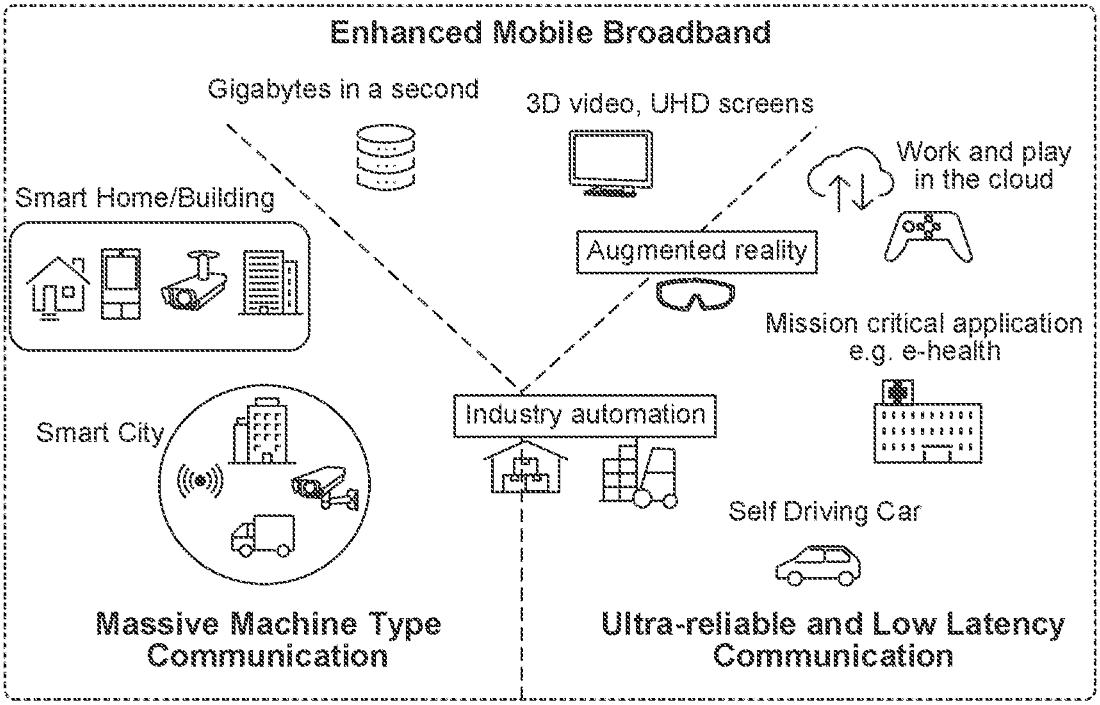
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see e.g. ITU-R M.2083 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 106 level), higher availability, packet sizes of up to 256 bytes, time synchronization down to the order of a few us where the value can be one or a few us depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QOS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g. as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
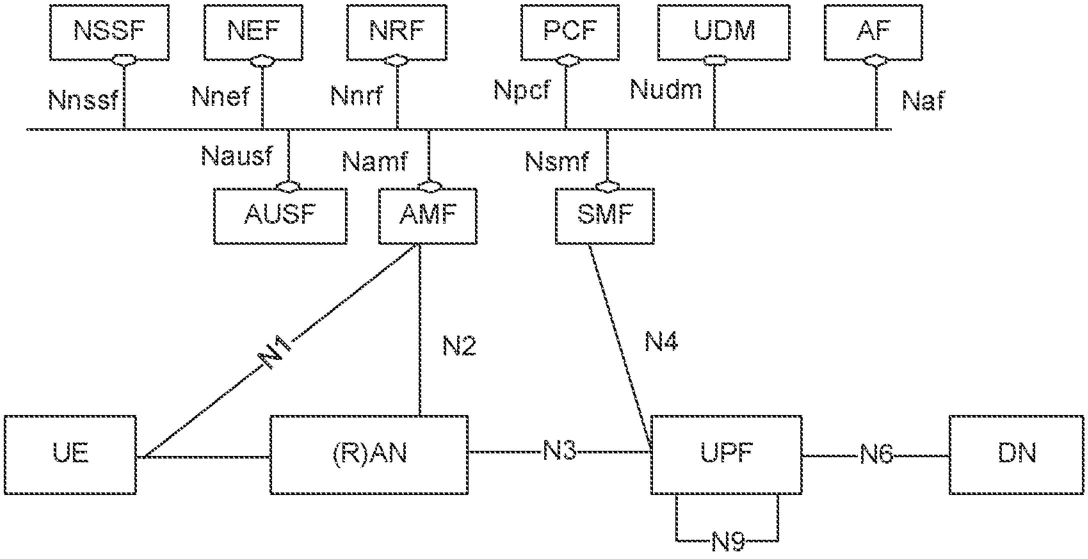
FIG. 5 is a block diagram showing an exemplary 5G system architecture for a non-roaming.

FIG. 5 illustrates a 5G NR non-roaming reference architecture (see TS 23.501 v16.1.0, section 4.23). An Application Function (AF), e.g. an external application server hosting 5G services, exemplarily described in FIG. 4, interacts with the 3GPP Core Network in order to provide services, for example to support application influence on traffic routing, accessing Network Exposure Function (NEF) or interacting with the Policy framework for policy control (see Policy Control Function, PCF), e.g. QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QOS requirement for at least one of URLLC, eMMB and mMTC services to at least one of functions (for example NEF, AMF, SMF, PCF, UPF, etc) of the 5GC to establish a PDU session including a radio bearer between a gNodeB and a UE in accordance with the QoS requirement and control circuitry, which, in operation, performs the services using the established PDU session.

Downlink Control Channel Monitoring, PDCCH, DCI

Many of the functions operated by the UE involve the monitoring of a downlink control channel (e.g. the PDCCH, see 3GPP TS 38.300 v16.7.0, section 5.2.3) to receive e.g. particular control information or data destined to the UE.

A non-exhaustive list of these functions is given in the following:

- a paging message monitoring function,
- a system information acquisition function,
- signalling monitoring operation for a Discontinued Reception, DRX, function,
- inactivity monitoring operation for a Discontinued Reception, DRX, function,
- random access response reception for a random access function,
- reordering function of a Packet Data Convergence Protocol, PDCP, layer.

As mentioned above, the PDCCH monitoring is done by the UE so as to identify and receive information intended for the UE, such as the control information as well as the user traffic (e.g. the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that e.g. schedules a downlink data channel (e.g. the PDSCH) or an uplink data channel (e.g. PUSCH). In 5G NR there are a number of different DCI Formats defined already (see TS 38.212 v16.7.0 section 7.3.1).

Said DCI formats represent predetermined formats in which respective information is formed and transmitted. In particular, DCI formats 0_1 and 1_1 are used for scheduling PUSCH and PDSCH, respectively, in one cell.

The PDCCH monitoring of each of these functions serves a particular purpose and is thus started to said end. The PDCCH monitoring is typically controlled at least based on a timer, operated by the UE. The timer has the purpose of controlling the PDCCH monitoring, e.g. limiting the maximum amount of time that the UE is to monitor the PDCCH. For instance, the UE may not need to indefinitely monitor the PDCCH, but may stop the monitoring after some time so as to be able to save power.

As mentioned above, one of the purposes of DCI on the PDCCH is the dynamic scheduling of resources in downlink or uplink or even sidelink. In particular, some formats of DCI are provided to carry indication of resources (resource allocation, RA) allocated to a data channel for a particular user. The resource allocation may include specification of resources in frequency domain and/or time domain.

Time-Domain in 5G NR

Figure 6:
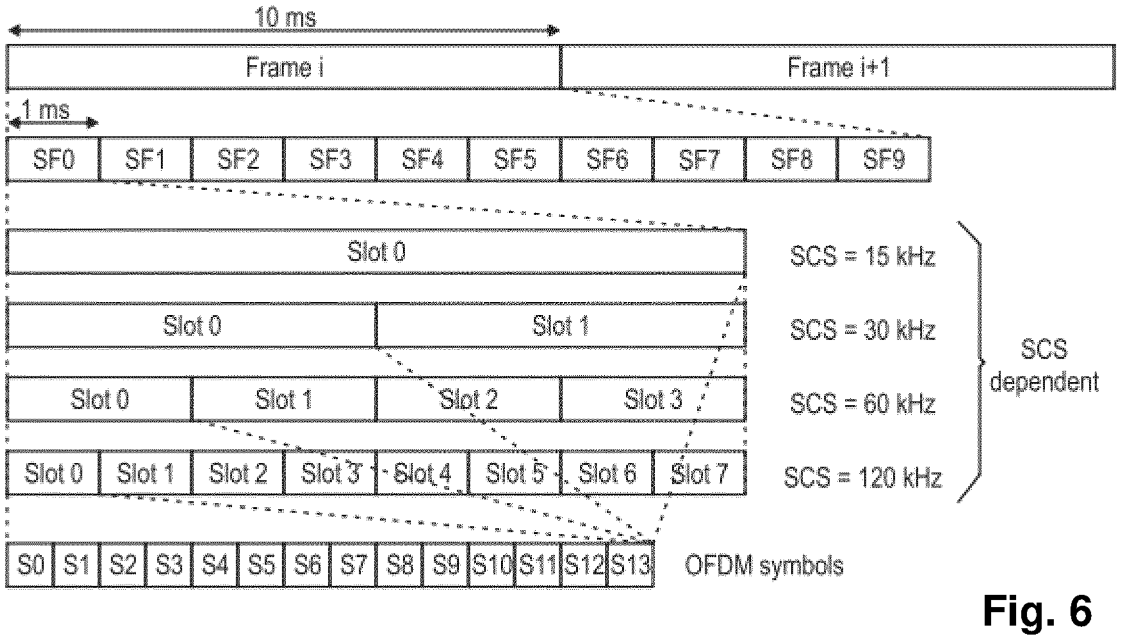
FIG. 6 illustrates an exemplary time-domain structure in a communication system, such as 5G NR, including radio frames, subframes, slots, and OFDM symbols for different subcarrier spacings.

In the time domain, transmissions in 5G NR are organized into frames of length 10 ms, each of which is divided into 10 equally sized subframes of length 1 ms. A subframe in turn is divided into one or more slots consisting of 14 OFDM symbols each. The duration of a slot in milliseconds depends on the numerology. For instance, for the 15 kHz subcarrier spacing, an NR slot thus has the same structure as an LTE subframe with normal cyclic prefix. A subframe in 5G NR serves as a numerology-independent time reference, which is useful, especially in the case of multiple numerologies being mixed on the same carrier, while a slot is the typical dynamic scheduling unit. This frame structure on which the 3GPP 5G NR communication is based in exemplarily illustrated in FIG. 6.

Slot Formats

5G NR provides a plurality of slot formats, a slot format indicates how each of symbols within a single slot is used. It defines which symbols are used for uplink and which symbols are used for downlink within a specific slot. In LTE TDD, if a subframe (equivalent to a Slot in NR) is configured for DL or UL, all of the symbols within the subframe should be used as DL or UL. But in NR, the symbols within a slot can be configured in various ways as follows.

In the present disclosure, the combination of DL symbol, UL symbol, Flexible Symbol within a slot is not limited to one combination. Additionally, the combination of DL symbol, UL symbol, and Flexible Symbol may be a predefined symbol combination.

Semi-Persistent Scheduling (SPS)

There are two types of scheduling for downlink. One is called 'Dynamic Scheduling' and the other one SPS (Semi Persistent Scheduling). Dynamic scheduling is the mechanism in which each and every PDSCH is scheduled by a DCI (DCI 1_0 or DCI 1_1). SPS is the mechanism in which the PDSCH transmissions are configured by a RRC message.

In more detail, a UE can be configured with one or more SPS configurations (in the present disclosure SPS configurations are also referred to as SPSs). An SPS configuration usually corresponds to a periodic set of DL resources configured by the base station for DL transmission. That is, the resources of an SPS configuration usually follow a certain periodicity in time domain in which there is a certain time interval between consecutive (continuous) resource allocations of the SPS.

The configured SPS correspond to respective DL SPS traffics and be associated with respective certain HARQ process IDs. That is, in general, each SPS may be associated with a respective HARQ process ID. The transmissions of an SPS (received in the resources of the SPS configuration) may here also be referred to as a DL traffic, and the individual transmissions of an SPS, transmitted in a single resource allocation of the SPS, as instances of said DL traffic.

3GPP has been working on enhancements for enhanced industrial Internet of things (IIoT) and ultra-reliable low-latency (URLLC) in Rel. 17. This includes improving the UE feedback, such as HARQ-ACK and CQI transmissions.

Semi-persistent scheduling (SPS) can be exploit for deterministic URLLC traffic, such as time sensitive network (TSN), by reserving resources for downlink (DL) data transmissions and associated HARQ-ACK feedback in uplink (UL).

PUCCH Formats for Feedback

The main purpose of PUCCH is to carry UCI (Uplink Control Information). In particular, the PUCCH can be used for HARQ-ACK feedback in UL for SPS.

There are five different formats of PUCCH in 5G NR which have already been defined (see TS 38.211 V 16.7.0 Table 6.3.2.1-1 PUCCH formats) and which one of them is used can be determined by how many bits of information should be carried and how many symbols are assigned as shown in the below reproduced table.

It particular, the description in the table is based on TS 38.300 V 16.7.0 sec. 5.3.3, describing the short PUCCH format of up to two UCI bits is based on sequence selection, while the short PUCCH format of more than two UCI bits frequency multiplexes UCI and Demodulation Reference Signal (DMRS). The long PUCCH formats time-multiplex the UCI and DMRS. Frequency hopping is supported for long PUCCH formats and for short PUCCH formats of duration of 2 symbols. Long PUCCH formats can be repeated over multiple slots. The PUCCH formats are summarized in the following table.

| Format Types | Length of Symbols | Number of bits | Descriptions (based on TS 38.300 V 16.7.0 sec. 5.3.3) |
|---|---|---|---|
| Format 0 | 1~2 | <=2 | Short PUCCH.<br>with UE multiplexing in the same physical resource block (PRB).<br>Based on sequence selection. |
| Format 1 | 4~14 | <=2 | Long PUCCH.<br>with multiplexing in the same PRB.<br>time-multiplex the UCI and DMRS |
| Format 2 | 1~2 | >2 | Short PUCCH.<br>with no multiplexing in the same PRB.<br>frequency multiplexes UCI and DMRS |
| Format 3 | 4~14 | >2 | Long PUCCH.<br>with large UCI payloads and with no multiplexing capacity in the same PRB<br>time-multiplex the UCI and DMRS |
| Format 4 | 4~14 | >2 | Long PUCCH.<br>with moderate UCI payloads and with some multiplexing capacity(max 4 UE) in the same PRB. |

Different criteria can be formulated which PUCCH format to use. For example, the first criteria would be how many UCI bits needs to be carried. Further, the possibility of UE multiplexing in the same Physical resource block (PRB) may be used. Further, the robustness in various radio channel condition may be used as a criteria.

Notably, in general the term "physical resource block" (PRB) refers to the smallest allocable resource unit usable for (user) data transmission. In LTE and NR, a PRB has a predetermined number (e.g. 12) of consecutive subcarriers in frequency domain and a predetermined number of symbols in time domain (e.g. 14 OFDM symbols in LTE).

PUCCH Location and Repetition

TS 38.213 V16.7.0 defines in sec. 9.2.1 PUCCH Resource Sets. As can be derived, some parameters applies to all PUCCH format but some parameters applies to only specific formats as below.

In particular, the number of PRBs can apply to only PUCCH format 2 and 3. Further, the starting PRB can apply to all PUCCH Format.

Further, for example the starting symbol can apply to all PUCCH format, but range of values can vary depending the format. E.g. PUCCH format 0 and format 2 may have a starting symbol of S0 to S13 while PUCCH format 1, format 3, and format 4 may have a starting symbol of S0 to S10 in above FIG. 6.

Further, for example the number of symbol can apply to all PUCCH format, but range of values can vary depending on the format. E.g. PUCCH format 0 and format 2 may have a number of symbols of 0 or 1 while PUCCH format 1, format 3, and format 4 may have a number of symbols of 4 to 14.

In other words, based on the PUCCH format for example specific symbols of a slot/mini-slot may be used for transmitting an HARQ-ACK.

Further, following TS 38.213 V16.7.0 sec. 9.2.6 version 15.3.0, depending on the PUCCH format a repetition procedure may be established. For example, PUCCH formats 1, 3, or 4 may be configured for a repetition procedure. In particular, for a configured number of slots, the UE repeats the PUCCH transmission with the UCI over dedicated slots.

In view of the above, a SPS HARQ-ACK may be transmitted by a variety of possibilities, e.g. using various PUCCH formats, using a specific location, using various slot locations.

SPS HARQ-ACK

In view of these possibilities, it has been agreed upon that a limit on the maximum deferral of SPS HARQ in terms of k1def or k1+k1def is to be supported.

K1 is the offset between a DL slot where the data is scheduled on PDSCH and the UL slot where the ACK/NACK feedback for the scheduled PDSCH data need to be sent. In other words, K1 is the delay between PDSCH reception and PUCCH transmission.

K1def is the (maximum) deferral values. In particular, k1def is the deferral value of the slots.

The limitation may e.g. be given by a maximum value of k1def or a maximum of k1deff=k1+k1def, and be determined e.g. by K1 set(s) or an RRC configured limit. The limit on the maximum deferral of SPS HARQ may be defined in terms of k1eff=k1+k1def, and there may be no lower limit defined for k1def. In other words, for SPS HARQ-ACK deferral, the maximum deferral value in terms of k1+k1def is RRC configured per SPS configuration.

It has been agreed that the SPS HARQ-ACK deferral is enabled per SPS configuration. In particular, it may be only HARQ-ACK of SPS PDSCH configurations enabled for deferral.

Further, the definition of when to defer from the initial slot can be based on the condition that the deferral is only possible, if the SPS HARQ-ACK in the initial slot/sub-slot cannot be transmitted as the resulting PUCCH resource for transmission using the PUCCH by SPS-PUCCH-AN-List-r16 or n1PUCCH-AN is not valid.

For SPS HARQ-ACK deferral, only SPS HARQ bit(s) subject to deferral from HARQ-ACK codebook from an initial PUCCH slot are deferred to the target PUCCH slot.

For SPS HARQ-ACK deferral, deferred SPS HARQ bits from more than one 'initial PUCCH slot' can be jointly deferred to a target PUCCH slot.

For SPS HARQ-ACK deferral, the target PUCCH slot is defined as the next PUCCH slot where sps-PUCCH-AN-List-r16 or n1PUCCH-AN PUCCH resource is regarded as valid, or a PUCCH resource (from PUCCH-ResourceSet, i.e. DG PDSCH HARQ multiplexed) is dynamically indicated.

The target PUCCH slot determination is based on the total HARQ-ACK payload size including deferred SPS HARQ-ACK information and non-deferred HARQ-ACK information (if any) of a candidate target PUCCH slot.

The final PUCCH resource selection in the target PUCCH slot in terms of PUCCH resource set and PUCCH resource ID follows the Rel-16 procedures.

For SPS HARQ-ACK deferral, if after the target PUCCH slot determination the deferred SPS HARQ-ACK cannot be transmitted, the deferred SPS HARQ-ACK bits are not further deferred and are dropped.

For SPS HARQ-ACK deferral, in the target PUCCH slot the deferred SPS HARQ-ACK bits are appended to the initial HARQ bits/Type 1 or Type 2 codebook.

In an updated version of RAN1 #104b-e it has been agreed to handle the collision for the same HARQ process due to deferred SPS HARQ-ACK it is specified that if the UE is expected to receive PDSCH of a certain HARQ PROCESS ID according to TS 38.214 Sec. 5.1, the deferred SPS HARQ-ACK bit(s) for this HARQ Process ID are dropped.

Collisions

Accordingly, in particular when the UE is operating in Time Division Duplex (TDD), it may be determined that a transmission opportunity that collides with one or more DL symbols that the transmission opportunity is not to be used for transmitting the (any) available SPS HARQ-ACK.

In addition, the PUCCH repetition could aggravate the situation, as a PUCCH needs to be repeated over several slots/mini-slots, as will be shown in the following.

Figure 7:
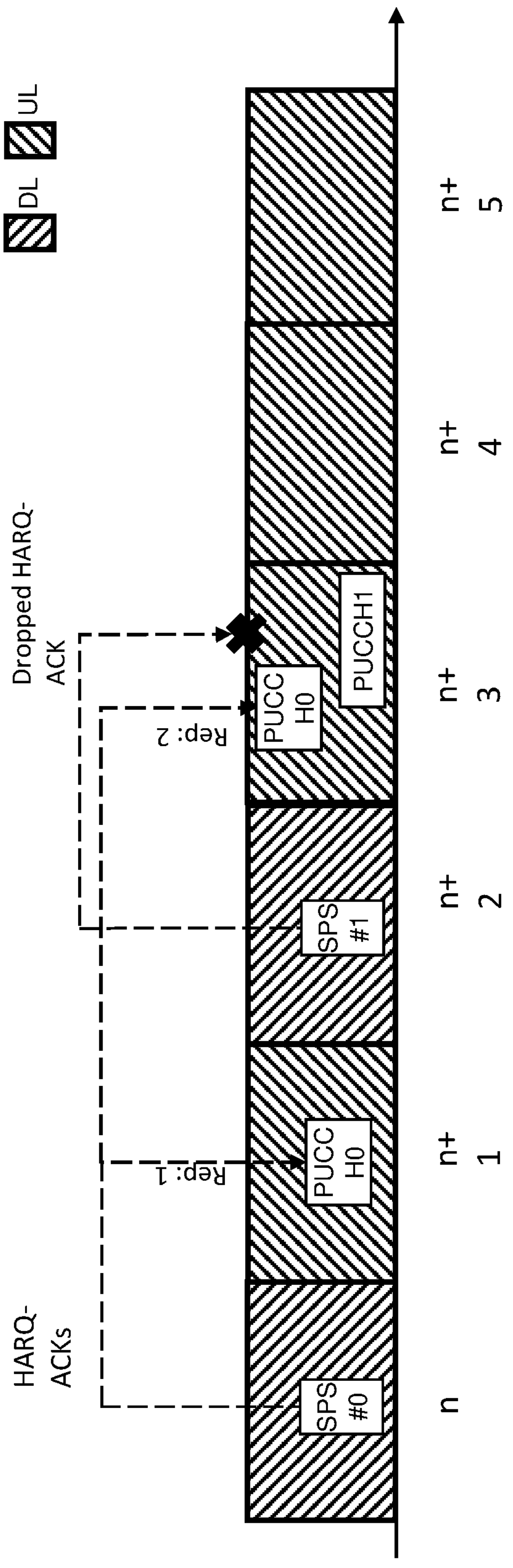
FIG. 7 is a schematic drawing illustrating a scenario if a UCI transmission opportunity is not available.

In particular, as for example shown in FIG. 7, the UE is configured with two SPS configurations, with corresponding resources for SPS #0 in slot n and resources for SPS #1 in slot n+2. Furthermore, the SPS #0 configuration is configured with k1=1, k1def=4 and provides that the UE can send the acknowledgement feedback (HARQ ACK/NACK) for SPS #0 with PUCCH0, wherein the PUCCH0 in turn is configured with using the repetition functionality (e.g. 2 transmissions in total). The SPS #1 configuration is configured with k1=1 and K1def=0 and provides that the UE can send the acknowledgement feedback for SPS #1 with PUCCH1, where the PUCCH1 in turn is configured without repetition functionality. As apparent from slot n+3 as illustrated in FIG. 7, the PUCCH0 and PUCCH1 resources overlap.

Consequently, the first transmission of the acknowledgement feedback for SPS #0 is transmitted in slot n+1, due to k1=1, (see label "Rep: 1"), and a repetition of same is scheduled to be transmitted in slot n+3 (see label "Rep: 2"), still within the allowed k1def limit. Similarly, the acknowledgment feedback for SPS #1 is scheduled to be transmitted in slot n+3 too, due to k1=1. Thus, the repetitive transmission of the feedback information in PUCCH0 for SPS #0 in slot n+3 can thus collide with the transmission of the feedback information in PUCCH1 for SPS #1. Only one of PUCCH0 and PUCCH1 can be transmitted by the UE.

Discussed HARQ-ACK deferral solutions can address these issues only to some extent, by postponing the transmission of SPS HARQ-ACKs. However, additional considerations are required when the PUCCH repetition is enabled.

In such cases, the repetition of the HARQ-ACK report could be dropped or deferred for later transmission. Or, for example, as shown in FIG. 7, the PUCCH1 in slot n+3 is dropped. In any case, the HARQ-ACK dropping may reduce the communication reliability.

Further, the HARQ-ACK deferral may increase the latency and lead to the collision of HARQ processes.

Finally, in case of a collision, it may be ambiguous for the UE which HARQ report (or other UCI) may be transmitted and which may be dropped. For example, as shown in FIG. 7, the deferred repetitive transmission of the HARQ feedback in PUCCH0 for SPS #0 may collide with the HARQ-ACK of a SPS #1, which is to be reported by PUCCH1 in slot n+3 too.

The inventors have identified the above-discussed potential drawbacks and challenges and have thus identified the possibility of providing an improved UCI report procedure that allows efficiently transmitting repetitive acknowledgment information, e.g. PUCCH0 in slot n+1, and UCI, e.g. PUCCH1 in slot n+3. The present invention relates to different solutions and variants for such an improved acknowledgment procedure.

For instance, the improved acknowledgement procedure includes an improved target transmission opportunity determination that allows more efficiently transmitting a repetitive SPS-HARQ ACK report of a first SPS configuration, e.g. the PUCCH0 in slot n+1, in case of a collision with an additional SPS-HARQ ACK report of a second SPS configuration, an UCI to be transmitted in slot n+3, or a collision of the repetitive transmission with a DL symbol.

In particular, when a UE is enabled for both HARQ-ACK deferral, as shown in FIG. 7, and PUCCH repetitions, as shown for PUCCH0, a collision of PUCCH repetition with another PUCCH transmission, e.g. the PUCCH1 transmission of SPS #1, can occur.

Embodiments

In the following, UEs, base stations, and respective procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been and are made herein so as to be able to explain the principles underlying the present disclosure in a clear, concise and understandable manner. These assumptions are however to be understood merely as examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers etc. used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology, but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term “base station” or “radio base station” here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Communication between the UE and the base station is typically standardized and may be defined by different layers, such as PHY, MAC, RRC etc. (see above background discussion).

The term “transmission opportunity” refers to UL resources that are available for transmitting information, such as uplink control information, UCI. In general, the transmission opportunities may be determined by the base station and a corresponding indication may be sent to the UE. The UE may then obtain and/or determine, from said indication, e.g. from a DCI signaling received from a base station over PDCCH or PDSCH, the transmission opportunities. However, the present invention is not limited thereto. In general, PUCCH resources may not be reserved in advance and, for instance, could be used according to the k1 and k1def values. In general, it is also possible that some transmission opportunities are configured by the base station and other transmission opportunities are determined autonomously by the UE based on e.g. k1 timing values. In general, the transmission opportunity used in the application is to be broadly understood e.g. as a symbol, a slot, a mini-slot or the like that the UE uses for transmitting UCI over PUCCH or PUSCH. Additionally, the transmission opportunity can specify a dedicated channel, e.g. a PUCCH format used for the transmission of the UCI.

The term "acknowledgment information" refers to an acknowledgement (ACK) or not acknowledgment (NACK) feedback that may be sent by the UE to transmit a positive or negative feedback, for example, whether a SPS transmission has been received or not by the UE.

The term "time interval" refers to at least one symbol, a slot, a mini-slot or the like.

Contents of the "user control information (UCI)" may refer to CSI, ACK/NACK, a scheduling request (SR) or combinations thereof. In particular, the UCI may be an acknowledgment information or a SR.

The term "repetition" refers to methods in which the UE transmits information, for example the acknowledgement feedback, multiple times. In particular, the initial transmission of the information is repeated in at least one further different time interval, such as slot or mini-slot. In particular, the advantage is that it increases the probability that the transmitted information reaches the destination.

The condition that a "transmission opportunity is not available" refers broadly to e.g. collision conditions. For example, such a collision condition is that a PRB for a certain transmission, e.g. the transmission of UCI, is colliding with a PRB for a second transmission, e.g. the repetitive acknowledgement feedback of a SPS configuration. For example, a symbol identified necessary for transmission of e.g. a UCI, can be blocked by symbol(s) of a PRB identified for a repetitive transmission of an acknowledgement information. As a result, only one of the two transmissions can be performed.

Figure 8:
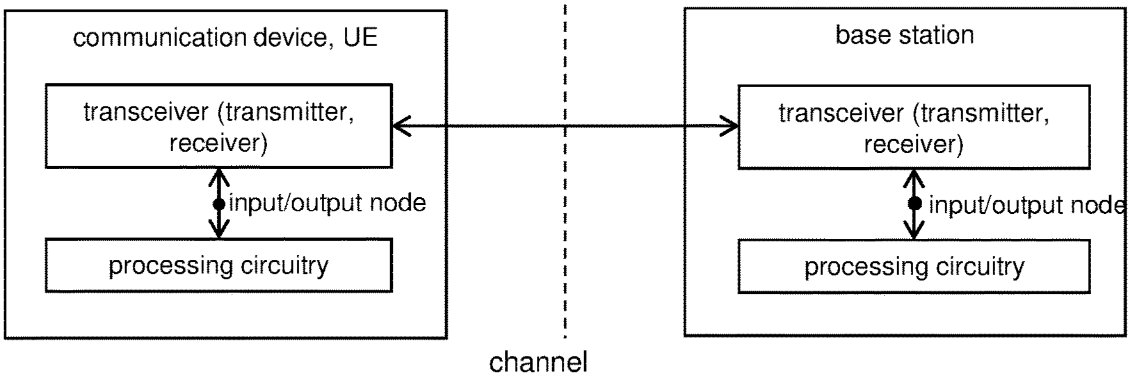
FIG. 8 an exemplary and simplified structure of a UE and gNB.

FIG. 8 illustrates a general, simplified and exemplary block diagram of a user equipment (also termed communication device) and a scheduling device (here exemplarily assumed to be located in the base station, e.g. the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e. control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

Different solutions of an improved acknowledgement transmission procedure, including an improved target transmission opportunity determination, will be described in the following. In said connection, improved UEs and improved base stations are presented, which participate in the improved procedures. Corresponding methods for the UE behavior and the base station behavior are provided as well. The integrated circuits correspond to the UE and base station, respectively their behavior.

Figure 9:
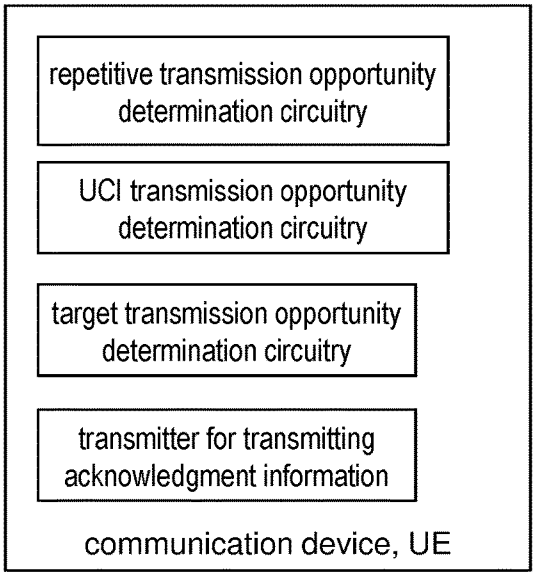
FIG. 9 illustrates a structure of the UE according to an exemplary implementation of an improved target opportunity determination procedure.

FIG. 9 illustrates a simplified and exemplary UE structure according to an exemplary implementation of the acknowledgement transmission procedure, which can be implemented based on the general UE structure explained in connection with FIG. 8. The various structural elements of the UE illustrated in said FIG. 9 can be interconnected between one another e.g. with corresponding input/output nodes (not shown) e.g. in order to exchange control and user data and other signals. Although not shown for illustration purposes, the UE may include further structural elements.

As apparent from FIG. 9, the UE may include a circuitry for determining a repetitive transmission opportunity, a circuitry for determining a UCI transmission opportunity, a circuitry for determining a target transmission opportunity, and a transmitter for transmitting an acknowledgement information.

In the present case as will become apparent from the below disclosure, the processing circuitry can thus be configured to at least partly perform one or more of determining, based on a SPS configuration, an initial transmission opportunity and at least one repetitive transmission opportunity for an acknowledgement information, determining a UCI transmission opportunity for transmitting the UCI, and determining, if the UCI transmission opportunity is not available, a target transmission opportunity etc.

In the present case as will become apparent from the below disclosure, the transmitter can thus be configured to at least partly perform one or more of transmitting the UCI, such as HARQ feedback or a scheduling request, etc.

In the present case as will become apparent from the below disclosure, the receiver can thus be configured to at least partly perform one or more of receiving downlink information via a SPS configuration etc.

One exemplary procedure as will be disclosed in more detail further below is implemented by a UE that includes the following. A processor of the UE determines based on a SPS configuration, an initial transmission opportunity and at least one repetitive transmission opportunity for an acknowledgement information, determines a UCI transmission opportunity for transmitting UCI, and determines, if the UCI transmission opportunity is not available, a target transmission opportunity.

A transmitter of the UE transmits, using the determined target transmission opportunity, the acknowledgment information.

A corresponding exemplary method comprises the following steps performed by a UE:

determining, based on a SPS configuration, an initial transmission opportunity and at least one repetitive transmission opportunity for an acknowledgement information;

determining, a UCI transmission opportunity for transmitting UCI;

determining, if the UCI transmission opportunity is not available, a target transmission opportunity;

transmitting, using the target transmission opportunity, the acknowledgment information.

Figure 10:
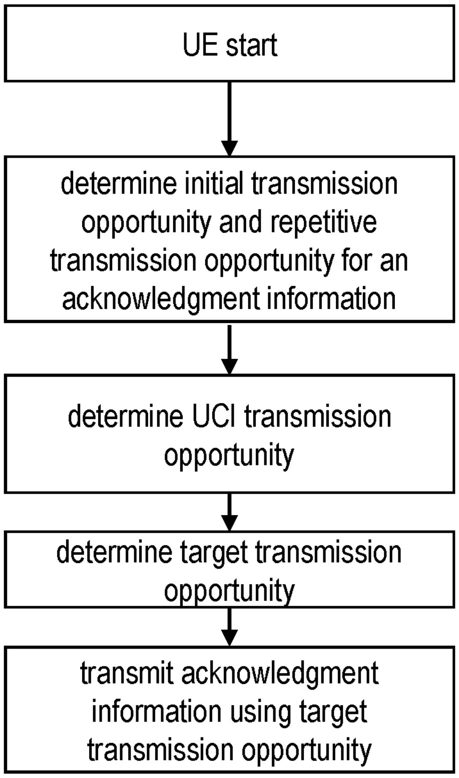
FIG. 10 is a flow diagram for the UE behavior, according to an exemplary implementation of the improved target opportunity determination procedure.

A corresponding sequence diagram for an exemplary UE behaviour in line with the above-discussed UE and UE method is illustrated in FIG. 10. As apparent therefrom, the UE determines, based on a SPS configuration, an initial transmission opportunity and at least one repetitive transmission opportunity for an acknowledgement information. Further, the UE determines UCI transmission opportunity for transmitting UCI. Further, the UE determines, if the UCI transmission opportunity is not available, a target transmission opportunity. Further, the UE transmits the acknowledgment information using the target transmission opportunity.

Some exemplary implementations of the improved target transmission opportunity determination procedure also involve the base station, to which the UE is currently connected (termed e.g. serving base station). Correspondingly, the improved target transmission opportunity determination procedure also provides an improved base station that participates therein.

Figure 11:
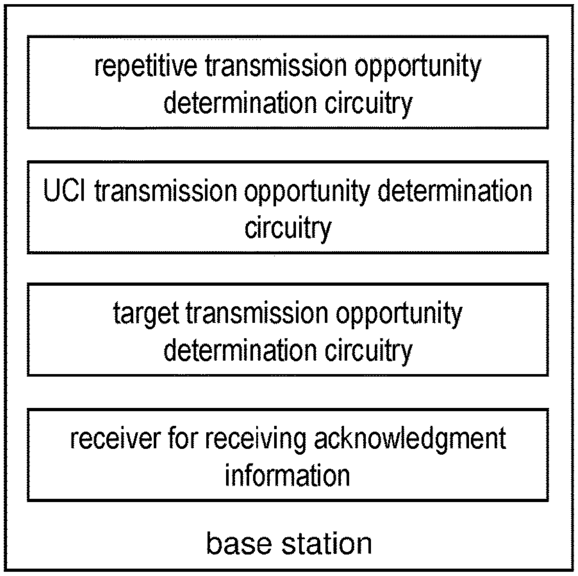
FIG. 11 illustrates a structure of the base station according to an exemplary implementation of an improved target opportunity determination procedure.

FIG. 11 illustrates a simplified and exemplary base station structure according to an exemplary implementation of the improved acknowledgement transmission procedure, and which can be implemented based on the general base station structure explained in connection with FIG. 8. The various structural elements of the base station illustrated in said FIG. 11 can be interconnected between one another e.g. with corresponding input/output nodes (not shown) e.g. in order to exchange control and user data and other signals. Although not shown for illustration purposes, the base station may include further structural elements.

As apparent therefrom, the base station comprises a circuitry for determining a repetitive transmission opportunity, a circuitry for determining a UCI transmission opportunity, a circuitry for determining a target transmission opportunity, and a receiver for receiving an acknowledgement information.

In the present case as will become apparent from the below disclosure, the processor of the base station can thus be configured to at least partly perform one or more of determining, based on a SPS configuration, an initial transmission opportunity and at least one repetitive transmission opportunity for an acknowledgement information, determining a UCI transmission opportunity for transmitting UCI, determining, if the UCI transmission opportunity is not available, a target transmission opportunity, etc.

In the present case as will become apparent from the below disclosure, the transmitter of the base station can thus be configured to at least partly perform one or more of transmitting downlink information to the UE, etc.

In the present case as will become apparent from the below disclosure, the receiver of the base station can thus be configured to at least partly perform one or more of receiving uplink control information from the UE, such as HARQ feedback or a scheduling request, etc.

One exemplary procedure as will be disclosed in more detail further below is implemented by a base station that includes the following. A processor of the base station determines based on a SPS configuration, an initial transmission opportunity and at least one repetitive transmission opportunity for an acknowledgement information, determines a UCI transmission opportunity for transmitting UCI, and determines, if the UCI transmission opportunity is not available, a target transmission opportunity.

A receiver of the base station receives, using the determined target transmission opportunity, from the UE the acknowledgment information.

A corresponding exemplary method comprises the following steps performed by a base station:

- determining, based on a SPS configuration, an initial transmission opportunity and at least one repetitive transmission opportunity for an acknowledgement information;
- determining, a UCI transmission opportunity for transmitting UCI;
- determining, if the UCI transmission opportunity is not available, a target transmission opportunity;
- receiving, using the target transmission opportunity the acknowledgment information.

Figure 12:
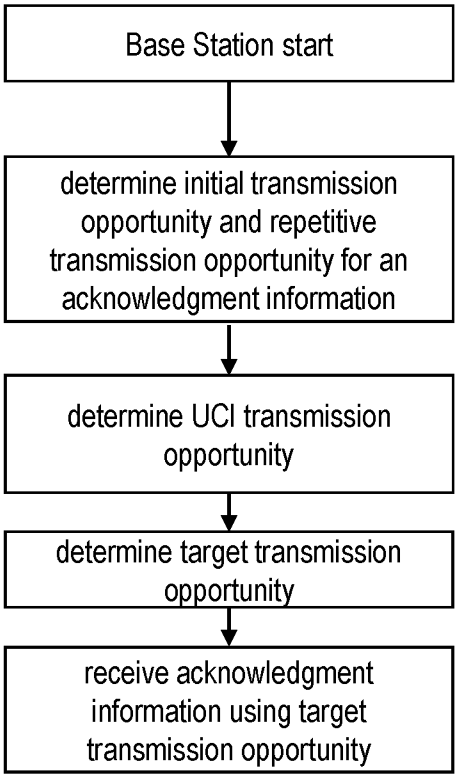
FIG. 12 is a flow diagram for the base station behavior according to an exemplary implementation of the improved target opportunity determination procedure.

A corresponding sequence diagram for an exemplary base station behavior in line with the above-discussed base station and corresponding method is illustrated in FIG. 12. The sequence diagram illustrates an exemplary and simplified implementation of the above presented base station method. As apparent therefrom, the base station determines, based on a SPS configuration, an initial transmission opportunity and at least one repetitive transmission opportunity for an acknowledgement information. Further, the UE determines UCI transmission opportunity for transmitting UCI. Further, the UE determines, if the UCI transmission opportunity is not available, a target transmission opportunity. Further, the UE transmits the acknowledgment information using the target transmission opportunity.

Figure 13:
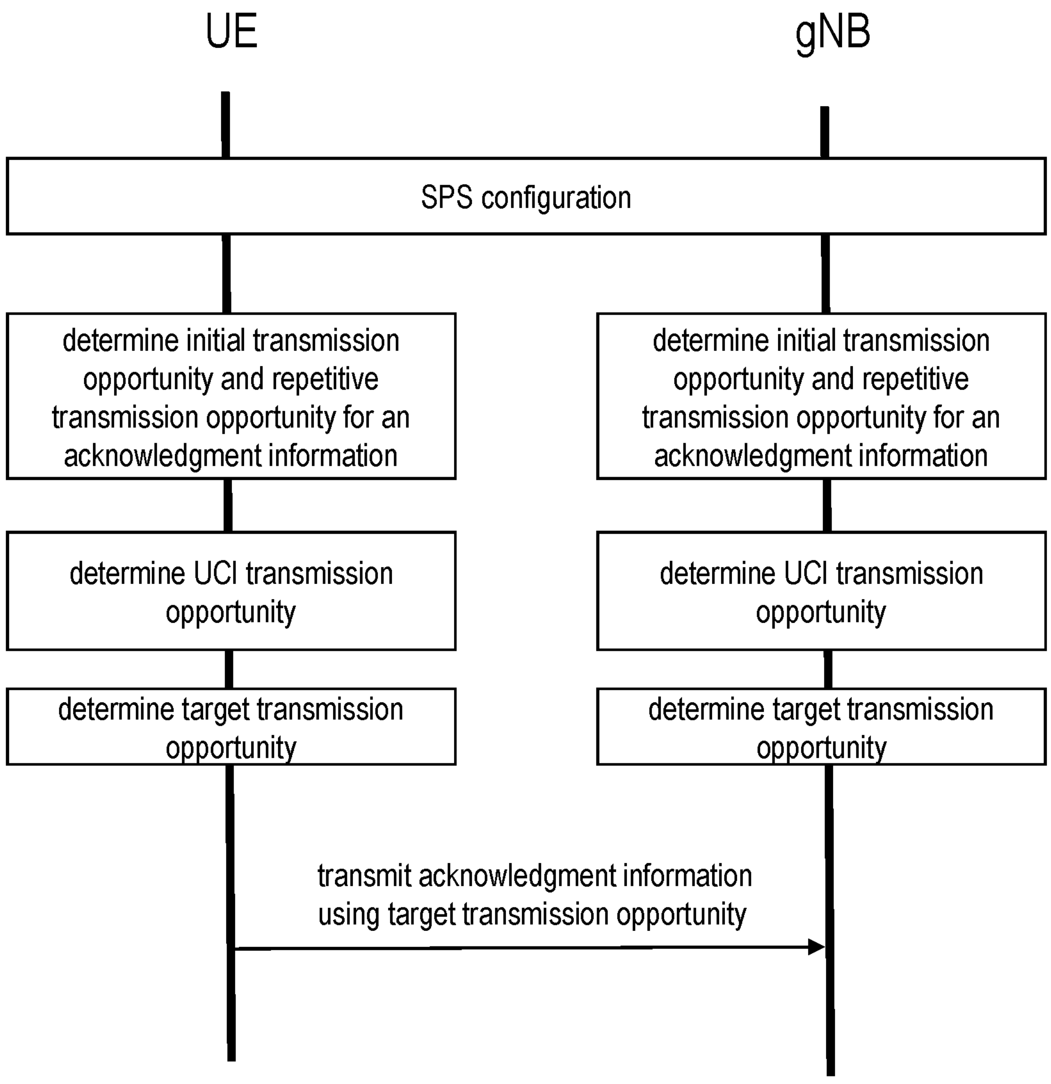
FIG. 13 is a signaling diagram illustrating an exemplary exchange between the UE and the gNB for an exemplary implementation of the improved target opportunity determination procedure.

FIG. 13 illustrates a simplified and exemplary interaction between the improved UE and improved base station of the above discussed improved acknowledgment transmission procedure. In this solution presented in FIG. 13, the interaction starts with the UE and the base station being configured with one or more SPS configurations. In particular, the SPS configuration usually corresponds to a periodic set of DL resources configured by the base station for DL transmission. That is, the resources of an SPS configuration usually follow a certain periodicity in the time domain in which there is a certain time interval between consecutive (continuous) resource allocations of the SPS.

The UE and the base station determine based on the SPS configuration an initial transmission opportunity and at least one repetitive transmission opportunity for an acknowledgement information. In particular, a SPS configuration for an HARQ-ACK report may enable repetition of an acknowledgment information.

The UE and the base station determine an UCI transmission opportunity for transmitting UCI, wherein the UCI is not the acknowledgement information. For example, the UE may be configured with a second SPS, and the UCI may be additional acknowledgement information for said second SPS. In view of the above, the repetitive transmission opportunity and the UCI can collide, i.e. the UCI transmission opportunity is not available.

The UE and the base station determine, if the UCI transmission opportunity is not available, a target transmission opportunity. Such a determination of a target transmission opportunity enables that the UE and the base station determine unambiguously the time interval, e.g. slot or mini-slot, and/or channel, e.g. PUCCH format, used for transmitting the acknowledgement information.

The UE uses the target transmission opportunity for transmitting the acknowledgement information. Thus, the acknowledgement information can be transmitted more efficiently in case that UCI transmission is not available.

In the following, different solutions for a UE target transmission opportunity determination are described. The target transmission opportunity thus determined is to be used for the efficient transmission of acknowledgment information. In particular, the UE can take actions in order to determine suitable HARQ-ACKs transmission opportunities, e.g. based on a SPS configuration, in particular based on defined deferral periods such as k1 or k1def as described above.

First Assumption

In the following, the solutions are discussed based on a first assumption quite similar to the scenario assumed for FIG. 7 used for explaining the underlying disadvantages. Correspondingly, it is assumed that the UE is configured with two SPS configurations, with corresponding resources in different slots. The UE determines, based on both SPS configurations SPS #0 and SPS #1, a transmission opportunity for transmitting the acknowledgment information for said SPS #0 and further acknowledgement information for said SPS #1.

Additionally, the first SPS is for example configured with enabled HARQ-ACK deferral. Additionally or alternatively, the second SPS is for example configured with disabled HARQ-ACK deferral, i.e. k1def=0.

In particular, the UE is configured in a first time interval with a first SPS configuration (SPS #0) and is configured in a second time interval with a second SPS configuration (SPS #1). For example, the first time interval may be a first slot, and the second time interval may be a second slot. For example, the time interval used for feedback of the first SPS configuration is not equal to the time interval used for feedback of the second SPS configuration.

For example, the acknowledgment information is HARQ ACK or a HARQ NACK feedback. Similarly, the additional acknowledgement information is for example a HARQ ACK or a HARQ NACK feedback.

The UE determines an initial transmission opportunity and a repetitive transmission opportunity for the HARQ feedback for the first SPS configuration SPS #0, for example, based on the first SPS configuration including at least one of a k1, k1def, and PUCCH format. Similarly, the UE determines a further transmission opportunity for the HARQ feedback for the second SPS configuration SPS #1, for example based on the second SPS configuration including at least one of a k1, k1def, and PUCCH format.

In such a scenario, it is then assumed that the UE determines that one transmission opportunity is not available, for example, if the transmission opportunity for the additional acknowledgment information for the second SPS (SPS #1) overlaps with the repetitive transmission opportunity for the acknowledgment information for the first SPS (SPS #0).

First Solution

According to a first exemplary solution, if one of the two transmission opportunities for transmitting HARQ feedback for SPS #0 and SPS #1 is not available, the UE determines a target transmission opportunity that is different from the one initially intended by the UE. More specifically, the UE may determine a physical uplink control channel (PUCCH) for the target transmission opportunity. Further, according to the example, the UE uses the determined PUCCH for transmitting the acknowledgment information for the first SPS configuration multiplexed with the other acknowledgment information for the second SPS configuration.

In more detail, multiplexing is a method by which multiple signals, in this case the acknowledgment information for the first SPS configuration and the additional acknowledgement information for the second SPS configuration, are for example combined and are transmitted together over a resource on a shared medium, e.g. a PUCCH or PUSCH. For example, the PUCCH format may enable to share at least one of time and frequency resources. The invention, however, is not limited to such multiplexing of shared resources.

In view of the first assumption, such a multiplexing particularly enables that the HARQ-ACKs for both SPS #0 and SPS #1 are transmitted within their maximum deferral periods (i.e., k1+k1def) and no delay is incurred for either transmission.

Figure 14:
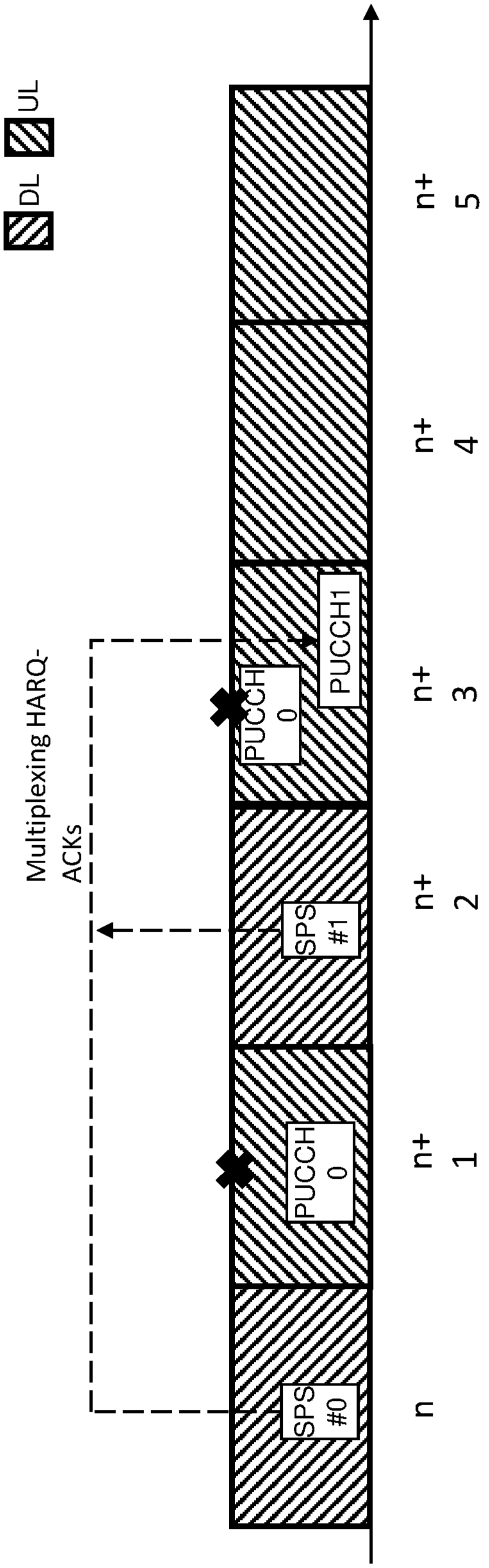
FIG. 14 is a schematic drawing illustrating first exemplary UE behavior for a first solution.

A first example of using multiplexing according to the first exemplary solution is shown in FIG. 14. Similarly to the configuration shown above in FIG. 7, a first SPS configuration SPS #0 is for example configured enabling HARQ-ACK deferral, e.g. with k1=1 and k1def=4. Further, the first SPS configuration SPS #0 is for example configured using PUCCH0 with repetitions, for example two repetitions.

The example shown in FIG. 14 assumes that the first SPS configuration SPS #0 is received in a first time interval, e.g. slot n. Thus, the corresponding acknowledgment information for the SPS #0 in slot n+1, can be transmitted using PUCCH0 according to the example in any one of slot n+1, n+3 to slot n+5. In particular, according to the example shown in FIG. 14, the transmission opportunity in slot n+2 for the repetitive transmission of the acknowledgement information for SPS #0 is blocked, for example, because slot n+2 is reserved for DL symbols.

Further, FIG. 14 shows an example using the first assumption, namely that the UE determines based on a second SPS configuration (SPS #1) a transmission opportunity for the HARQ feedback for SPS #1. For example, the SPS #1 configuration is present in a second time interval, e.g. slot n+2, and the UE determines the corresponding transmission opportunity for transmitting the additional acknowledgment information, via PUCCH1, in slot n+3.

Similarly to the configuration shown above in FIG. 7, the second SPS configuration SPS #1 is for example configured without enabling HARQ-ACK deferral, e.g. with k1=1 and k1def=0. Further, the second SPS configuration SPS #1 is for example configured using PUCCH1 with only one transmission, i.e. without repetition.

The example shown in FIG. 14 assumes that a resource for the second SPS configuration SPS #1 is present in a second time interval, e.g. slot n+2. Thus, the acknowledgment information, e.g. PUCCH1, can be transmitted according to the example only in slot n+3, i.e. n+2+k1+k1def.

In view of the above, according to the exemplary first solution to more efficiently transmit the acknowledgment information, the repetition 2 of PUCCH0 and the additional acknowledgment information, i.e. PUCCH1, is multiplexed. For example, a PUCCH, e.g. in FIG. 14 PUCCH1 with a target transmission opportunity in slot n+3, is used for carrying the acknowledgement information for SPS #0 and the additional acknowledgment information for SPS #1. Correspondingly, the UE does not use the repetitive transmission opportunity for transmitting the acknowledgment information of SPS #0, i.e. slot n+3, by using PUCCH0.

Additionally, according to a further example illustrated in FIG. 14, the UE does not use the initial transmission opportunity for transmitting the acknowledgment information of SPS #0, i.e. of slot n+1, using PUCCH0.

The benefit is that acknowledgment information, e.g. HARQ-ACKs, for a plurality of SPS configurations, e.g. SPS #0 and SPS #1, are transmitted within their maximum deferral periods, e.g. k1+k1def.

Thus, the UE may postpone the acknowledgment information for SPS #0, e.g. PUCCH0 transmission in slot n+1, to a later time interval, e.g. a slot, a sub-slot, a mini-slot, to be multiplexed in another PUCCH resource, e.g. PUCCH1 in slot n+3.

Figure 15:
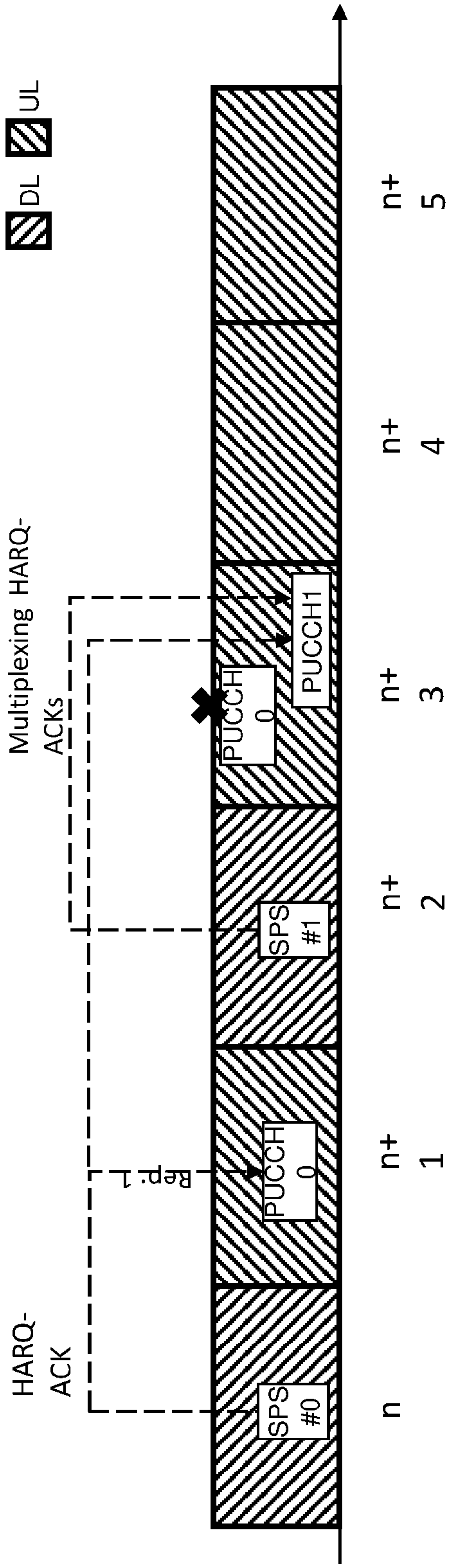
FIG. 15 is a schematic drawing illustrating second exemplary UE behavior for a first solution.

An alternative example of the first solution is shown in FIG. 15, being based on a similar scenario to the configuration shown in FIG. 14. In contrast to the example discussed in FIG. 14, the UE uses the initial transmission opportunity for transmitting the acknowledgment information for SPS #0, i.e. slot n+1, by using PUCCH0 with repetition 1 in the example. Similarly to the example discussed in FIG. 14, the UE does not use the repetitive transmission opportunity for SPS #0, i.e. repetition 2, PUCCH0 in slot n+3. Instead, according to this example, the SPS #0 acknowledgment information the second repetition 2 thereof, is multiplexed with the additional acknowledgment information for SPS #1, e.g. using a different PUCCH, here PUCCH1, in slot n+3.

The benefit is that the acknowledgment information, e.g. HARQ-ACKs, for a plurality of SPS configurations, e.g. SPS #0 and SPS #1, are transmitted within their respective maximum deferral periods, e.g. k1+k1def. Additionally, the acknowledgment information for the first SPS configuration, e.g. HARQ-ACK for SPS #0 in slot n+1, is sent as early as possible, and the HARQ feedback for SPS #0 gains from the repeated transmissions.

In other words, the UE for example terminates repetition of acknowledgment information for SPS #0 in slot n+3, and the payload can be retransmitted for example by multiplexing in other PUCCH resource(s), e.g. using PUCCH1 in slot n+3.

Second Solution

According to a second exemplary solution, if one of the two transmission opportunities for transmitting HARQ feedback for SPS #0 and SPS #1 is not available, the UE determines a target transmission opportunity that is different from the one initially intended by the UE. The UE determines, based on a maximum deferral indication (k1+k1def) comprised in the first SPS configuration (SPS #0), a target time interval for the target transmission opportunity. The target time interval is different from a repetitive time interval of the repetitive transmission opportunity, and the UE uses the target time interval for transmitting the acknowledgment information.

For example, the repetition of the acknowledgment information for SPS #0 is suspended in order to first transmit UCI, for example in view of the first assumption the additional acknowledgment information for the second SPS configuration (SPS #1). Correspondingly, the repetition of the acknowledgment information is resumed after the additional acknowledgment information for the second SPS configuration (SPS #1) is transmitted.

In particular, suspension or deferral according to the second solution is a deferral in time. For example, the target time interval of the target transmission opportunity and the repetitive time interval of the repetitive transmission opportunity (i.e. the initially intended opportunity for transmitting the second repetition) is a slot or a mini-slot.

Figure 16:
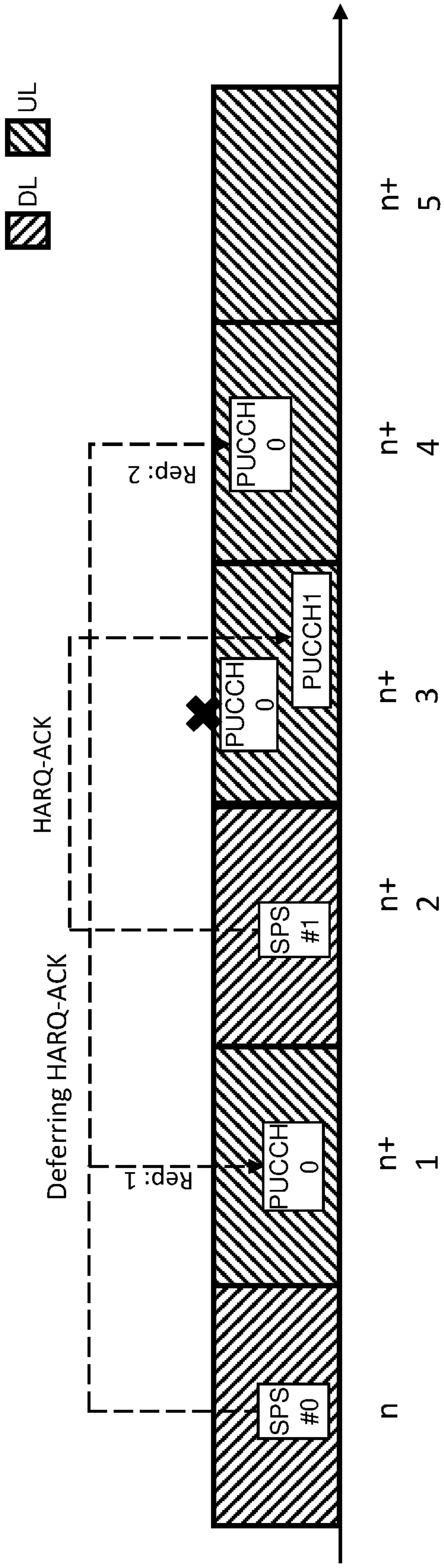
FIG. 16 is a schematic drawing illustrating first exemplary UE behavior for a second solution.

A first example of using a deferral of acknowledgment information according to the second exemplary solution is shown in FIG. 16. Similarly to the configuration shown above in FIG. 7, a first SPS configuration SPS #0 is for example configured enabling HARQ-ACK deferral, e.g. with k1=1 and k1def=4. Further, the first SPS configuration SPS #0 is for example configured using PUCCH0 with repetitions, for example two repetitions.

The example shown in FIG. 16 assumes that the first SPS configuration SPS #0 is received in a first time interval, e.g. slot n. Thus, the corresponding acknowledgment information for SPS #0 in slot n+1 can be transmitted using the PUCCH0 according to the example in any of slot n+1 to slot n+5. In particular, according to the example shown in FIG. 16, the transmission opportunity in slot n+2 for the repetitive transmission of the acknowledgement information for SPS #0 is blocked, for example, because slot n+2 is reserved for DL symbols.

Further, FIG. 16 shows an example using the first assumption, namely that the UE determines based on a second SPS configuration (SPS #1) a transmission opportunity for the HARQ feedback for SPS #1. For example, the SPS #1 configuration is present in a second time interval, e.g. slot n+2, and the UE determines the corresponding transmission opportunity for transmitting the additional acknowledgment information, via PUCCH1, in slot n+3.

Similarly to the configuration shown above in FIG. 7, the second SPS configuration SPS #1 is for example configured without enabling HARQ-ACK deferral, e.g. with k1=1 and k1def=0. Further, the second SPS configuration SPS #1 is for example configured using PUCCH1 with only one transmission, i.e. without repetition.

The example shown in FIG. 16 assumes that a resource for the second SPS configuration SPS #1 is present in a second time interval, e.g. slot n+2. Thus, the acknowledgment information, e.g. PUCCH1, can be transmitted according to the example only in slot n+3, i.e. n+2+k1+k1def.

In view of the above, according to the exemplary second solution to more efficiently transmit the acknowledgment information, the repetition 2 of PUCCH0 is deferred so as to avoid the collision with the first (and only) transmission of the acknowledgement information for SPS #1 in PUCCH1.

For example, the UE determines as a target time interval, e.g. slot n+4, for the acknowledgement information, e.g. the repetition 2 of PUCCH0, in line with k1def=4 of the SPS #0 configuration.

According to the example shown in FIG. 16, the first transmission (Rep: 1) of the acknowledgment information for SPS #0, here Rep: 1 of PUCCH0, is performed in slot n+1. Thus, the first transmission of acknowledgment information for the first SPS configuration, e.g. HARQ-ACK for SPS #0, is sent as early as possible.

Additionally, according to one example, the second transmission (Rep: 2) of the acknowledgment information for SPS #0, here Rep: 2 of PUCCH0, is suspended in order to transmit first the additional acknowledgment information for SPS #1, here PUCCH1, which is performed in slot n+3.

The second transmission (Rep: 2) of the acknowledgment information for SPS #0, here Rep: 2 of PUCCH0, is s resumed afterwards, i.e., Rep: 2 is performed in slot n+4. The benefit is that acknowledgment information, e.g. HARQ-ACKs, for a plurality of SPS configurations, e.g. SPS #0 and SPS #1, are transmitted within their respective maximum deferral periods, e.g. k1+k1def.

Compared to the first solution with multiplexing, the reason why multiplexing the acknowledgment information for SPS #0, i.e. HARQ-ACK for SPS #0 with the acknowledgment information for SPS #1 in PUCCH1 is not possible, is for example a limited payload size capacity of the available resource, e.g. PUCCH1.

The present second example may thus be used, for example, in a case where multiplexing the HARQ-ACK for SPS #0 in PUCCH1 is not possible, for example, because of limited payload size capacity of the resource. Thus, according to a further example, if a PUCCH cannot carry acknowledgment information multiplexed with the UCI, the UE determines, based on a maximum deferral indication (k1+k1def) comprised in the SPS configuration, a target time interval for the target transmission opportunity for transmitting the second repetition of the acknowledgement information for SPS #0 of slot n, wherein the target time interval is different from a repetitive time interval of the repetitive transmission opportunity initially intended by the UE for the transmission of the second repetition.

Figure 17:
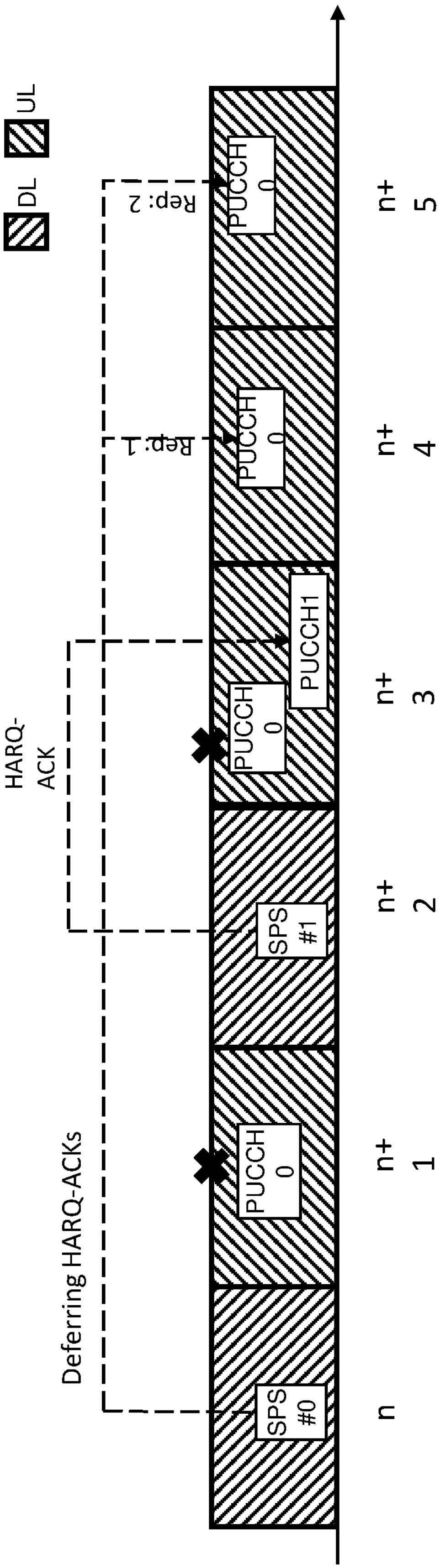
FIG. 17 is a schematic drawing illustrating second exemplary UE behavior for a second solution.

An alternative example for the second solution is shown in FIG. 17. The configuration shown in FIG. 17 is similar to the configuration shown in FIG. 16. In the example in FIG.

17 the initial transmission of the acknowledgment information for the HARQ feedback of SPS #0 in slot n is deferred too.

In particular, according to the illustrated example, the second target time interval and the initial time interval is for example a slot or a mini-slot.

In more detail, the UE defers, for example, the transmission of both repetitions of the acknowledgment information, e.g. HARQ-ACK for SPS #0, so as to be transmitted in a first and second target time interval, e.g. slot n+4 and n+5.

For example, the UE determines the first and second target time intervals based on the maximum deferral value, in the example K1def=4, and k1 configured for the SPS #0, resulting in a new delay between the DL SPS #0 slot, and the corresponding PUCCH transmission of the HARQ feedback, in the example resulting in k1eff=4 and k1eff=5, respectively for transmitting the acknowledgment information of the SPS configuration, here SPS #0.

Similar to the example disclosed with reference to FIG. 16, the additional acknowledgment information, e.g. HARQ-ACK for SPS #1, is transmitted using resources of PUCCH1 in slot n+3, also considering that no deferral is allowed for SPS #1 and PUCCH1, SPS #1 having k1def=0.

According to the example shown in FIG. 17, the UE uses the determined first and second target time interval for transmitting the acknowledgment information for the SPS #1 resource in slot n.

The benefit is that acknowledgment information, e.g. HARQ-ACKs, for a plurality of SPS configurations, e.g. SPS #0 and SPS #1, are transmitted within their respective maximum deferral periods, e.g. k1+k1def.

Third Solution

According to a third exemplary solution, the UE drops one of the two colliding acknowledgement information for SPS #0 and SPS #1.

For instance, this may involve that the UE determines, based on a maximum deferral indication (k1+k1def) comprised in the two SPS configurations (for SPS #0 and SPS #1), whether a target time interval for the target transmission opportunity for the HARQ feedback of the SPS #1 resource is equal to a repetitive time interval of the repetitive transmission opportunity for the HARQ feedback of the SPS #0 or not. In other words, a deferral of the two HARQ feedbacks, in line with the respective k1 and K1def parameters for the SPS #0 and SPS #1 configurations.

Compared to the first solution using multiplexing, the reason why multiplexing the acknowledgment information for SPS #0, i.e. HARQ-ACK for SPS #0 with the acknowledgment information for SPS #1 in PUCCH1 is not possible, is for example a limited payload size capacity of the available uplink control resourcePUCCH1. Therefore, a different solution than the first solution is needed to avoid the collision, in this case the third solution.

The present third solution may thus be used, for example, after determining that multiplexing the HARQ-ACK for SPS #0 with the HARQ-ACK for SPS #1 in PUCCH1 is not possible, for example, because of a limited payload size capacity of the available uplink control resource PUCCH1 in slot n+3.

In general, according to the further example, the UE uses PUCCH1 for transmitting the additional acknowledgement information for SPS #1.

Compared to the second solution using deferring, the reason why deferring the acknowledgment information for SPS #0, i.e. HARQ-ACK for SPS #0 in a target time interval is not possible, is for example that a maximal deferral indication (k1+k1def1) provided by the first SPS configuration SPS #0 does not allow a deferral to avoid the collision. Furthermore, it is assumed that the HARQ feedback for SPS #1 cannot be deferred either.

The present third example may thus be used, for example, in a case where deferral of the HARQ-ACK for SPS #0, according to the second solution, is not possible and optionally where multiplexing according to the first solution is not possible.

Thus, according to the third solution, to avoid the collision, the UE drops the transmission of the second repetition of the acknowledgment information for the SPS #0 resource. Instead, the UE uses the target transmission opportunity to transmit the acknowledgment information for the SPS #1 resource. In one example, if the UE determines, based on a maximum deferral indication (k1+k1def) comprised in the SPS configuration, that a target time interval for the target transmission opportunity for SPS #1 is equal to a repetitive time interval of the repetitive transmission opportunity for SPS #0, the UE uses the target time interval of the target transmission opportunity for transmitting the HARQ feedback of SPS #1 and the UE drops the transmission of the acknowledgment information using the target transmission opportunity.

According to an example, the UE may first determine that any example of the first solution is not possible. Then, the UE may in a second step determine that any example of the second solution is not possible. Then, the UE may proceed with the third solution.

According to the third solution, the UE terminates the repetition of acknowledgment information of the first SPS configuration SPS #0 in order to initiate transmission for the additional acknowledgment information for the second SPS configuration (SPS #1). Further, the UE for example drops the repetitive transmission of the acknowledgment transmission in said slot.

The benefit is that at least one acknowledgment information, e.g. HARQ-ACKs, for each of a plurality of SPS configurations, e.g. SPS #0 and SPS #1, are transmitted within their maximum deferral periods, e.g. k1+k1def.

Figure 18:
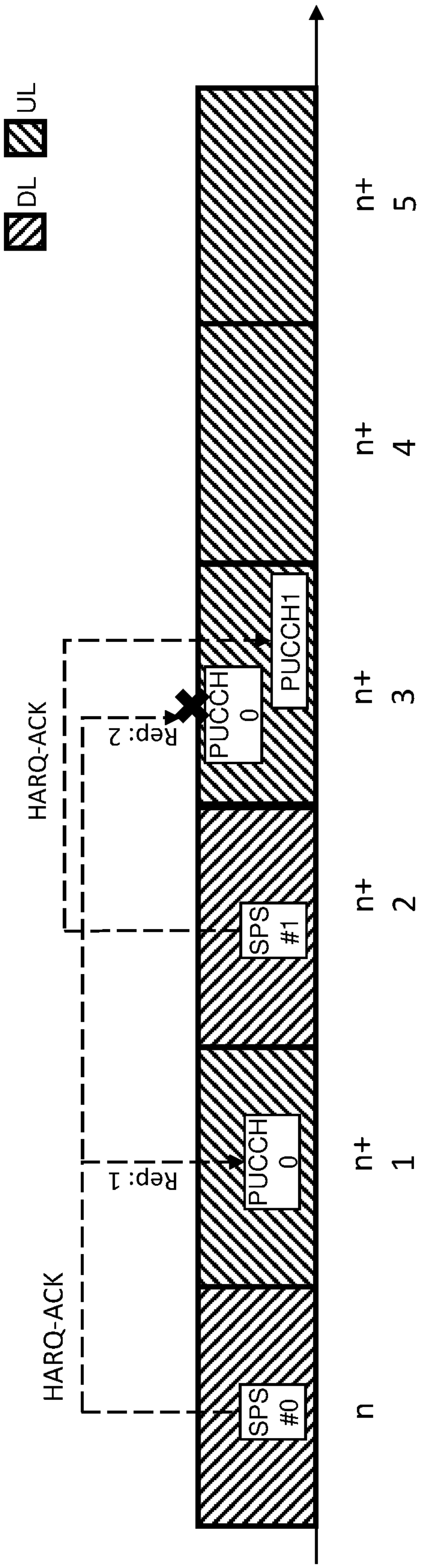
FIG. 18 is a schematic drawing illustrating exemplary UE behavior for a third solution.

An example using termination according to the third exemplary solution is shown in FIG. 18. Similar to the configuration shown above in FIG. 7, a first SPS configuration SPS #0 is for example configured enabling HARQ-ACK deferral, e.g. with k1=1. Further, the first SPS configuration SPS #0 is for example configured using PUCCH0 with repetitions, for example two repetitions.

However, instead of the maximum deferral value k1def=4 used in FIG. 7, the first SPS configuration SPS #0, as exemplary shown in FIG. 18, is for example configured with a maximum deferral value k1def=2. Thus, the acknowledgment information, e.g. PUCCH0 for SPS #0, can be transmitted according to the example in any of slot n+1 and slot n+3. In particular, according to the example shown in FIG. 18, the transmission opportunity in slot n+2 for the repetitive transmission of the acknowledgement information is blocked, for example, because slot n+2 is reserved for DL symbols.

Further, FIG. 18 shows an example using the first assumption, namely that the UE determines based on a second SPS configuration (SPS #1) a UCI transmission opportunity. For example, a resource of the SPS #1 configuration is present in a second time interval, e.g. slot n+2, and the UE determines the UCI transmission opportunity for transmitting the additional acknowledgment information being for example PUCCH1 in slot n+3

Similarly to the configuration shown above in FIG. 7, the second SPS configuration SPS #1 is for example configured without enabling HARQ-ACK deferral, e.g. with k1=1 and k1def=0. Further, the second SPS configuration SPS #1 is for example configured using PUCCH1 with only one transmission, without repetition.

In view of the above, in order to more efficiently transmit the acknowledgment information for SPS #0 and the additional acknowledgment information for SPS #1, the UE for example terminates the repetition of the acknowledgment information, e.g. repetition 2 of PUCCH0 in FIG. 18 in slot n+3. Instead, the additional acknowledgement information for SPS #1 is transmitted via PUCCH1 in slot n+3.

Additionally, the UE uses for example the initial transmission opportunity in n+1 for transmitting the acknowledgment information for SPS #0, as illustrated in FIG. 18.

In this scenario, shown in the example of FIG. 18, the first PUCCH transmission of HARQ-ACK for SPS #0 is performed in slot n+1. In slot n+3, the UE determines the possibility that either PUCCH0 or PUCCH1 can be sent. It is for example additionally determined that multiplexing is not feasible (e.g., due to the limited payload capacity of PUCCH0 and PUCCH1). The UE sends PUCCH1 instead of PUCCH0, which according to the example was already sent once before, namely in slot n+1.

Fourth Solution

For explaining a fourth exemplary solution, it is exemplarily assumed that the UE determines that the UCI transmission opportunity is not available if a symbol used for downlink overlaps with the UCI transmission opportunity. More specifically, it is assumed that the HARQ feedback transmission for the resource of the second SPS configuration SPS #1 is blocked by DL symbols in the corresponding slot.

For example, the UE determines that it is possible to use the transmission opportunity for transmitting the acknowledgment information for a resource of the first SPS configuration SPS #0. Further, the UE determines that the target transmission opportunity cannot be used for transmitting the acknowledgment information for a resource of the second configuration SPS #1.

According to the fourth solution, the UE for example changes the payload information of a PUCCH repetition to include other UCI, such as the additional HARQ-ACK(s) of the second SPS configuration SPS #1. In one example, a repetition counter used for the HARQ feedback information for SPS #0 could be restarted, after having been increased due to the first transmission of the HARQ feedback information for SPS #0 in a previous slot.

The benefit is that the number of PUCCH repetitions is achieved for the updated payload, which includes. HARQ-ACKs for the resources of both SPS configurations SPS #0 and SPS #1 and further that they are transmitted within their respective maximum deferral periods (i.e., k1+k1def).

Figure 19:
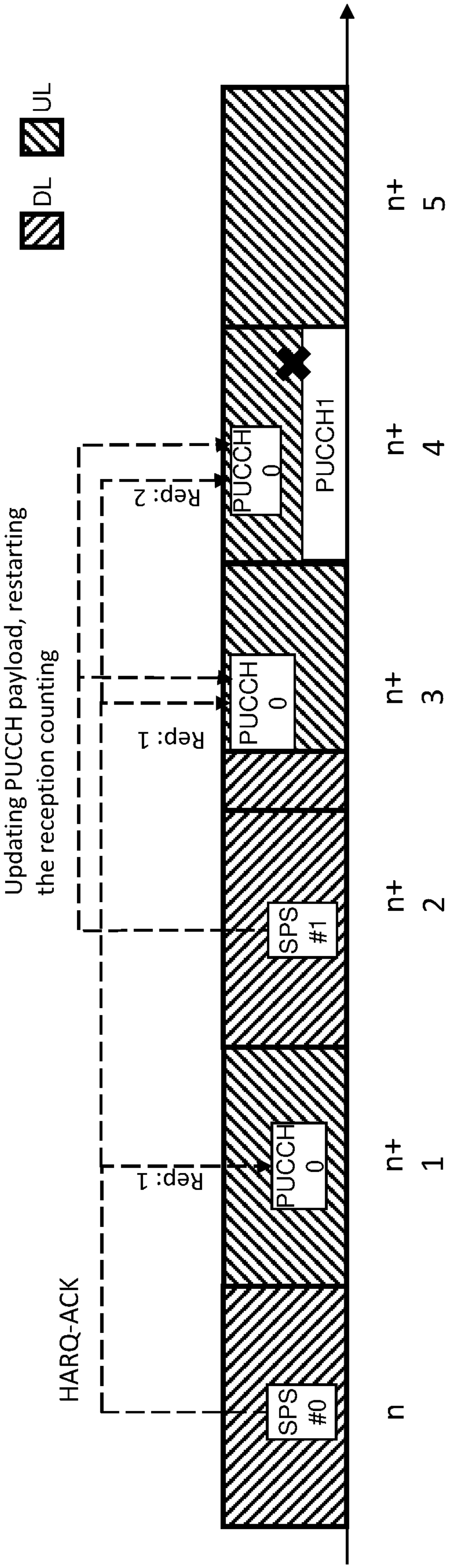
FIG. 19 is a schematic drawing illustrating exemplary UE behavior for a fourth solution.

An example using restarted repetition counter according to the fourth exemplary solution is shown in FIG. 19. Similarly to the configuration shown above in FIG. 7, a first SPS configuration SPS #0 is for example configured enabling HARQ-ACK deferral, e.g. with k1=1 and k1def=4. Further, the first SPS configuration SPS #0 is for example configured using PUCCH0 with repetitions, for example two repetitions.

The example shown in FIG. 19 assumes that a resource of the first SPS configuration SPS #0 is present in a first time interval, e.g. slot n. Thus, the acknowledgment information for said resource of SPS #0 can be transmitted according to the example via PUCCH0 in any of slot n+1, n+3 to slot n+5. In particular, according to the example shown in FIG. 19, the transmission opportunity in slot n+2 for the repetitive transmission of the acknowledgement information is blocked, for example, because slot n+2 is reserved for DL symbols.

Further, FIG. 19 shows an example using the first assumption, namely that the UE determines based on a second SPS configuration (SPS #1) a UCI transmission opportunity. Similarly to the configuration shown above in FIG. 7, the second SPS configuration SPS #1 is for example configured without enabling HARQ-ACK deferral, e.g. with k1=1 and k1def=0. Further, the second SPS configuration SPS #1 is for example configured using PUCCH1 with only one transmission, without repetition.

However, further to the configuration shown in above FIG. 7, the UCI transmission opportunity for transmitting the additional acknowledgment information for the second SPS #1 configuration is blocked, for example PUCCH1 in slot n+3 for SPS #1 resource in slot n+2. For example, as shown in FIG. 19, slot n+3 comprises partly DL symbols and partly UL symbols, and thus, the UCI transmission opportunity cannot be used for the additional acknowledgment information for SPS #1 in view of the additional DL symbols.

As further shown in the example in FIG. 19, the acknowledgment information for SPS #0, i.e. PUCCH0, can be transmitted in slot n+3 because PUCCH0 occupies, for example, less symbols than PUCCH1 and particularly uplink symbols.

As further shown in the example in FIG. 19, additional acknowledgment information for SPS #1, i.e. PUCCH1, cannot be transmitted in slot n+4, because the maximum deferral defined by k1 and k1def for SPS #1 does not allow such a deferral.

According to the example shown in FIG. 19, the UE updates the payload of PUCCH0 in slot n+3 by including not only the HARQ feedback for the SPS #0 resource of slot n but also the HARQ feedback for the SPS #1 resource of slot n+2. In particular, as shown in the example of FIG. 19, the UE restarts in slot n+3 the repetition counter for the HARQ feedback of PUCCH0. Further, the UE transmits, similar to the solution shown in FIG. 16, in slot n+4, the PUCCH0 with repetition 2, including both the HARQ feedback for the SPS #0 resource of slot n and also the HARQ feedback for the SPS #1 resource of slot n+2.

Further, in one example, the UE uses slot n+1 for transmission of PUCCH0 with repetition 1, regarding the HARQ feedback for the SPS #1 resource of slot n. This enables to give an early feedback of the SPS #0 configuration.

Modifications of the First to Fourth Solutions

The above solutions have been explained in view of the Figures with a second SPS configuration with only one transmission. Alternatively, second SPS may be configured with a PUCCH that enables repetitions.

The above solutions have been explained in view of the Figures with a second SPS configuration received in slot n+2. Alternatively, the second SPS may be configured in any slot or in a part of slot.

The above solutions have been explained in view of the Figures with a second SPS configuration where the corresponding k1def values do not allow deferral. Alternatively, the second SPS may be configured with HARQ-ACK deferral.

Second Assumption

In the following, the solutions are discussed based on a second assumption different to the scenario assumed for FIG. 7 used for explaining the underlying disadvantages. In particular, it is assumed that the UE is configured with one SPS configuration, which is associated with a PUCCH resource for the HARQ feedback configured with repetition.

Furthermore, the UE needs to transmit, within the maximum deferral period of the acknowledgement information, i.e. the HARQ of the SPS configuration, an uplink control information having a higher priority than the acknowledgement information, such as a scheduling request.

In view of the second assumption, the UE determines, based on a priority of the UCI, the UCI transmission opportunity for transmitting said high-priority UCI.

Additionally, the first SPS is for example configured with enabled HARQ-ACK deferral.

For example, the high-priority UCI is a scheduling request (SR), a CSI, or an additional acknowledgment information of a second SPS configuration, which according to the second assumption is UCI having a higher priority than the acknowledgment information.

In particular, as in FIG. 7, the UE is configured in a first time interval, e.g. slot n, with a first SPS configuration (SPS #0) and configured in a second time interval with the high priority UCI. For example, the first time interval may be a first slot, and the second time interval may be a second slot.

For example, the acknowledgment information is a HARQ ACK or a HARQ NACK feedback.

The UE determines an initial transmission opportunity and a repetitive transmission opportunity for the HARQ feedback for the first SPS configuration SPS #0, for example, based on the first SPS configuration including at least one of a k1, k1def, and PUCCH format. Further, the UE determines a further transmission opportunity for the high-priority UCI based on the priority of the UCI. In particular, according to the second scenario, the priority of the high-priority UCI is determined to be higher than the priority of the HARQ feedback for the first SPS configuration SPS #0.

Fifth Solution

According to a fifth exemplary solution, if the repetitive transmission opportunity for transmitting HARQ feedback for SPS #0 collides with the UCI transmission opportunity, the UE determines, based on a maximum deferral indication (k1+k1def) comprised in the first SPS configuration (SPS #0), a target time interval for the target transmission opportunity for transmitting the HARQ feedback of the SPS #1. The target time interval is different from a repetitive time interval of the repetitive transmission opportunity for the second repetition of the HARQ feedback for the SPS #0 resource, and the UE uses the target time interval for transmitting the acknowledgment information HARQ feedback of the SPS #1.

Further, for example the target time interval and the repetitive time interval is a slot or a mini-slot.

For example, the repetition of the acknowledgment information for the SPS #0 resource is suspended in order to first transmit the high-priority UCI, considering that the high-priority UCI has a higher priority than the acknowledgment information. The acknowledgment information repetition is resumed after the high-priority UCI has been transmitted.

In particular, suspension or deferral according to the fifth solution is similar to the second solution. For example, the suspension is a deferral in time.

Figure 20:
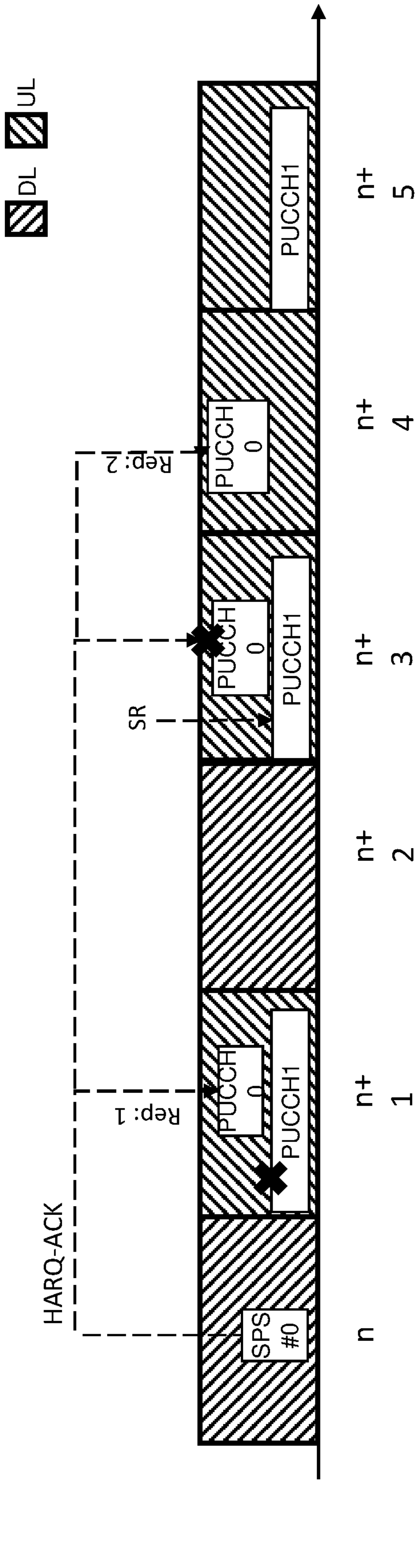
FIG. 20 is a schematic drawing illustrating exemplary UE behavior for a fifth solution.

A first example of using a deferral of acknowledgement information based on priority according to the fifth exemplary solution is shown in FIG. 20. Similarly to the configuration shown above in FIG. 7, a first SPS configuration SPS #0 is for example configured enabling HARQ-ACK deferral, e.g. with k1=1 and k1def=4. Further, the first SPS configuration SPS #0 is for example configured using PUCCH0 with repetitions, for example two repetitions.

The example shown in FIG. 20 assumes that a resource of the first SPS configuration SPS #0 is present in a first time interval, e.g. slot n. Thus, the corresponding acknowledgment information for the SPS #0 resource, can be transmitted using PUCCH0 according to the example in any of slot n+1, n+3 to slot n+5. In particular, according to the example shown in FIG. 20, the transmission opportunity in slot n+2 for the repetitive transmission of the acknowledgement information for SPS #0 is blocked, for example, because slot n+2 is reserved for DL symbols.

Further, FIG. 20 shows an example using the second assumption, namely that the UE determines based on a high-priority UCI, to use a UCI transmission opportunity transmitting the high priority UCI. For example, UCI transmission opportunities for the high-priority UCI are e.g. PUCCH1 in slots n+3 and n+5.

According to the example shown in FIG. 20, it is assumed that the Scheduling Request (SR) becomes available for transmission in time for slot n+3, and the UE intends to send the high-priority UCI, e.g. the SR in FIG. 20, in the third time interval, e.g. slot n+3. Thus, the high-priority UCI, e.g. SR, shall be transmitted according to the example in slot n+3.

In view of the above, according to the exemplary fifth solution to more efficiently transmit the acknowledgment information, the repetition 2 of PUCCH0 is deferred so as to avoid the collision with the transmission of the high-priory UCI, i.e. PUCCH1.

For example, the UE determines a target time interval, e.g. slot n+4, for the deferred acknowledgement information, e.g. the repetition 2 of PUCCH0.

According to the example shown in FIG. 20, the first transmission (Rep: 1) of the acknowledgment information for SPS #0, here Rep: 1 of PUCCH0, is performed in slot n+1. Thus, the first transmission of acknowledgment information for the first SPS configuration, e.g. HARQ-ACK for SPS #0, is sent as early as possible.

Additionally, according to one example, the second transmission (Rep: 2) of the acknowledgment information for SPS #0, here Rep: 2 of PUCCH0, is suspended in order to transmit first the high-priority UCI, here the SR in PUCCH1, which is performed in slot n+3. In other words, the UE uses for example the UCI transmission opportunity, e.g. PUCCH1 in slot n+3, for transmitting the high-priority UCI.

The second transmission (Rep: 2) of the acknowledgment information for SPS #0, here Rep: 2 of PUCCH0, is resumed afterwards, i.e. Rep: 2 is performed in slot n+4. The benefit is that high-priority UCI, e.g. the SR, is sent in timely manner. The acknowledgment information, e.g. HARQ-ACKs, for the first SPS configuration, e.g. SPS #0, is transmitted within allowed deferral period, e.g. k1+k1def.

Compared to the first solution with multiplexing, the reason why multiplexing the acknowledgment information for SPS #0, i.e. HARQ-ACK for SPS #0 with the high-priority UCI (e.g. SR) in PUCCH1 is not possible, is for example a limited payload size capacity of the available resource carrying the SR, i.e. PUCCH1.

The present fifth example may thus be used, for example, in a case where multiplexing the HARQ-ACK for SPS #0 in PUCCH1 is not possible, for example, because of limited payload size capacity of the resource. Thus, according to a further example, if a PUCCH cannot carry acknowledgment information multiplexed with the high-priority UCI, the determines based on a maximum deferral indication (k1+k1def) comprised in the SPS configuration SPS #0, a target time interval for the target transmission opportunity for transmission the second repetition of the HARQ feedback for the SPS #0 resource in slot n, wherein the target time interval is different from a repetitive time interval of the repetitive transmission opportunity initially intended by the UE for the transmission of the second repetition.

Figure 21:
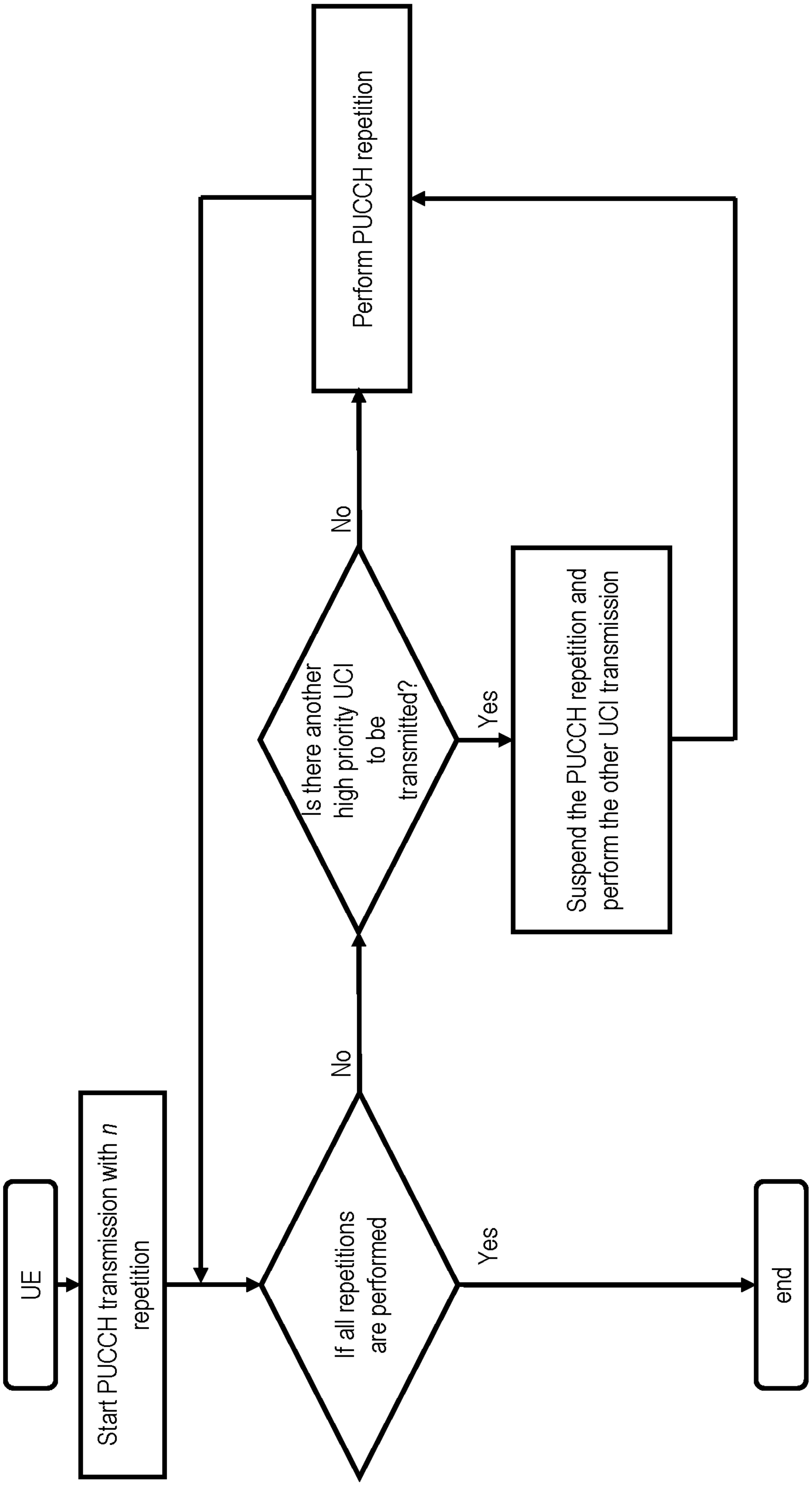
FIG. 21 is a flow diagram for the UE behavior, according to an exemplary implementation of the fifth solution.

A corresponding sequence diagram for an exemplary UE behaviour in line with the above-discussed fifth solution is illustrated in FIG. 21. As apparent therefrom, the UE determines, based on a SPS configuration, an initial transmission opportunity and at least one repetitive transmission opportunity for an acknowledgement information. In particular, as shown in FIG. 21, the UE starts PUCCH transmission with n repetition.

Further, the UE first determines for example if all n repetitions are performed.

In case that the UE determines that not all repetitions have been performed, for example as illustrated in slots n+1 to n+4 in above FIG. 20, the UE proceeds with determining, for example, if there is a high-priority UCI to be transmitted.

As discussed above, the UE determines that a high-priority UCI is to be transmitted, e.g. if the UCI is a SR, a CSI, or an additional acknowledgment information of a second SPS configuration having a higher priority.

For example, the UE determines after the first determination, namely if all n repetitions are performed, that the high-priority UCI is to be transmitted. For example, as shown in the example in FIG. 20, the UE intends to send the high-priority UCI, e.g. the SR in FIG. 20, in a time interval, e.g. slot n+3, after start of PUCCH transmission with n repetition, e.g. slot n+1 in FIG. 20.

For example, the priority of SR or CSI is higher than the priority of the acknowledgment information. Additionally or alternatively, the priority of the additional acknowledgment information, e.g. HARQ report (e.g. of one HARQ report, of more than one HARQ report, or of all/each HARQ report) may depend or be based on whether the HARQ report is an acknowledgement (ACK) or a negative-acknowledgement (NACK). For instance, the priority of a (or multiple or each) HARQ report may be higher when the HARQ report is an NACK than when the HARQ report is an ACK. For example, the UE determines a NACK for the additional acknowledgment information, and thus, determines to transmit the additional acknowledgment information.

Additionally or alternatively, the priority of the additional acknowledgment information may depend or be based on whether the PUCCH is configured for repetitive transmission and based on the number of repetitions. For instance, the priority of a PUCCH configured with a repetition may be lower than the priority of a PUCCH configured without repetition. For example, this may result in a similar solution as discussed above with the second solution.

In case that the UE determines that a high-priority UCI has to be transmitted, for example as illustrated by the SR in n+3 in FIG. 20, the UE proceeds with suspending the PUCCH repetition, e.g. not transmit the PUCCH0, and instead performs the transmission of the high-priority UCI, e.g. using PUCCH1 in above FIG. 20.

In case that the UE determines that no high-priority UCI has to be transmitted, for example as illustrated in the slot n+4 in above FIG. 20, the UE proceeds with transmitting the PUCCH repetition, e.g. transmits the acknowledgment information using the PUCCH0 in slot n+4.

After the determination, if a high-priority UCI has to be transmitted, the UE resumes with the PUCCH repetition.

In case that the UE determines that all repetitions have been performed, for example as illustrated in slot n+5 in above FIG. 20, the UE procedure ends.

Further Aspects

According to a first aspect, a user equipment, is provided that includes the following. A processing circuitry of the UE determines, based on a Semi-Persistent Scheduling (SPS) configuration, an initial transmission opportunity and at least one repetitive transmission opportunity for an acknowledgement information. The processing circuitry further determines a Uplink Control Information (UCI) transmission opportunity for transmitting UCI. The processing circuitry further determines, if the UCI transmission opportunity is not available, a target transmission opportunity. A transceiver circuitry uses the target transmission opportunity for transmitting the acknowledgment information.

According to a second aspect provided in addition to the first aspect, the UE determines, based on a second SPS configuration, the UCI transmission opportunity, wherein the UCI is additional acknowledgement information.

According to a third aspect provided in addition to the first or second aspect, the UE determines that the UCI transmission opportunity is not available, if the repetitive transmission opportunity overlaps with the UCI transmission opportunity.

According to a fourth aspect provided in addition to one of the first to third aspects, the UE determines a physical uplink control channel, PUCCH, for the target transmission opportunity, and the UE uses the PUCCH for transmitting the acknowledgment information multiplexed with the UCI.

According to a fifth aspect, provided in addition to the fourth aspect, the UE does not use the initial transmission opportunity for transmitting the acknowledgment information.

According to a sixth aspect, provided in addition to the fourth aspect, the UE uses the initial transmission opportunity for transmitting the acknowledgment information.

According to a seventh aspect provided in addition to the first to third aspects, the UE determines, based on a maximum deferral indication (k1+k1def) comprised in the SPS configuration, a target time interval for the target transmission opportunity, the target time interval being different from a repetitive time interval of the repetitive transmission opportunity, and the UE uses the target time interval for transmitting the acknowledgment information.

In an optional implementation, thereof, the UE uses the repetitive transmission opportunity for transmitting the UCI.

In a further optional implementation, thereof, at least one of the target time interval and the repetitive time interval is a slot or a mini-slot.

According to an eighth aspect provided in addition to the seventh aspect the UE determines, based on the maximum deferral indication comprised in the SPS configuration, a second target time interval for the initial transmission opportunity, the second target time interval being different from the repetitive time interval and an initial time interval of the initial transmission opportunity.

In an optional implementation, thereof, the UE uses the second target time interval of the initial transmission opportunity for transmitting the acknowledgment information.

In a further optional implementation, thereof, the second target time interval and the initial time interval is a slot or a mini-slot.

According to a ninth aspect provided in addition to the first or second aspect, the UE determines that the UCI transmission opportunity is not available if a symbol used for downlink overlaps with the UCI transmission opportunity.

According to a tenth aspect provided in addition to the first or ninth aspect, the UE determines, based on a second SPS configuration, the UCI transmission opportunity, wherein the UCI is additional acknowledgement information; and the UE uses the repetitive transmission opportunity for retransmitting the initial acknowledgement information and transmitting the additional acknowledgement information; and the UE uses the target transmission opportunity for retransmitting the repetitive acknowledgement information and the additional acknowledgement information.

In an optional implementation, thereof, the UE transmits the initial acknowledgement information at the initial transmission opportunity. Additionally, according to an optional implementation, thereof, a counter for counting the repetitive transmission is restarted with retransmitting the initial acknowledgement information and transmitting the additional acknowledgement information.

According to a eleventh aspect provided in addition to the first aspect, the UE determines, based on a priority of the UCI, the UCI transmission opportunity for transmitting UCI, wherein the UCI is a high-priority UCI having a higher priority than the acknowledgment information, and the UE determines, based on a maximum deferral indication comprised in the SPS configuration, a target time interval for the target transmission opportunity, the target time interval being different from a repetitive time interval of the repetitive transmission opportunity, and the UE uses the target time interval for transmitting the acknowledgment information.

In an optional implementation, thereof, the high high-priority UCI is a scheduling request.

In a further optional implementation, thereof, the UE uses the repetitive transmission opportunity for transmitting the UCI.

In a further optional implementation, thereof, at least one of the target time interval and the repetitive time interval is a slot or a mini-slot.

According to a twelfth aspect, provided in addition to any one of the first to eleventh aspects, the acknowledgement information comprises one or more hybrid automatic repeat request (HARQ) reports; and each of the HARQ reports is associated with downlink (DL) traffic of a certain HARQ process ID.

According to a thirteenth aspect, provided in addition to any one of the first to third aspects, if the UE determines, based on a maximum deferral indication (k1+k1def) comprised in the SPS configuration, that a target time interval for the target transmission opportunity is equal to a repetitive time interval of the repetitive transmission opportunity, the UE uses the target time interval of the target transmission opportunity for transmitting the UCI and the UE drops the transmission of the acknowledgment information using the target transmission opportunity.

In an optional implementation, thereof, the UE uses the initial transmission opportunity for transmitting the acknowledgment information.

In an optional implementation, thereof, if the UE additional determines that a physical uplink control channel (PUCCH), for the target transmission opportunity cannot be used for transmitting the acknowledgment information multiplexed with the UCI, the UE uses the PUCCH for transmitting the UCI.

According to a fourteenth aspect, a base station is provided comprising the a processing circuitry, which in operation, determines based on a Semi-Persistent Scheduling (SPS) configuration, an initial transmission opportunity and at least one repetitive transmission opportunity for receiving, from a UE, an acknowledgement information; determines a Uplink Control Information, UCI, transmission opportunity for receiving, from the UE, UCI; and determines, if the UCI transmission opportunity is not available, a target transmission opportunity. A receiver of the base station receives, from the UE, the acknowledgment information sing the target transmission opportunity.

According to a fifteenth aspect, provided in addition to the fourteenth aspect the base station determines, based on a second SPS configuration, the UCI transmission opportunity, wherein UCI is additional acknowledgement information.

According to a sixteenth aspect, provided in addition to the fourteenth or fifteenth aspects the base station determines, that the UCI transmission opportunity is not available, if the repetitive transmission opportunity overlaps with the UCI transmission opportunity.

According to a seventeenth aspect, provided in addition to any one of the fourteenth to sixteenth aspects, the base station determines a PUCCH for the target transmission opportunity, and the base station uses the PUCCH for receiving, from the UE, the acknowledgment information multiplexed with the UCI.

According to an eighteenth aspect, provided in addition to the seventeenth aspect, the base station does not use the initial transmission opportunity for receiving, from the UE, the acknowledgment information.

According to an nineteenth aspect, provided in addition to any one of the seventeenth aspect, the base station uses the initial transmission opportunity for receiving, from the UE, the acknowledgment information.

According to a $20^{th}$ aspect, provided in addition to any one of the fourteenth to sixteenth aspects, the base station determines based on a maximum deferral indication (k1+k1def) comprised in the SPS configuration, a target time interval for the target transmission opportunity, the target time interval being different from a repetitive time interval of the repetitive transmission opportunity, and the base station uses the target time interval for receiving, from the UE, the acknowledgment information.

In an optional implementation, thereof, the base station uses the repetitive transmission opportunity for receiving, from the UE, the UCI.

In a further optional implementation, thereof, at least one of the target time interval and the repetitive time interval is a slot or a mini-slot.

According to a $21^{st}$ aspect, provided in addition to the $20^{th}$ aspect the base station determines, based on the maximum deferral indication comprised in the SPS configuration, a second target time interval for the initial transmission opportunity, the second target time interval being different from the repetitive time interval and an initial time interval of the initial transmission opportunity.

In an optional implementation, thereof, the base station uses the second target time interval of the initial transmission opportunity for receiving, from the UE, the acknowledgment information.

In a further optional implementation, thereof, at least one of the second target time interval and the initial time interval is a slot or a mini-slot.

According to a $22^{nd}$ aspect, provided in addition to the fourteenth or fifteenth aspect, the base station determines that the UCI transmission opportunity is not available if a symbol used for downlink in the UE overlaps with the UCI transmission opportunity.

According to a $23^{rd}$ aspect, provided in addition to the fourteenth or $22^{nd}$ aspect, the base station determines, based on a second SPS configuration, the UCI transmission opportunity, wherein the UCI is additional acknowledgement information; the base station uses the repetitive transmission opportunity for repetitive receiving, from the UE, the initial acknowledgement information and receiving, from the UE, the additional acknowledgement information; and the base station uses the target transmission opportunity for repetitive receiving, from the UE, the repetitive acknowledgement information and the additional acknowledgement information.

In an optional implementation, thereof, the base station receives the initial acknowledgement information at the initial transmission opportunity. Additionally, according to an optional implementation, a counter for counting the repetitive receiving is restarted with repetitive receiving the initial acknowledgement information and receiving the additional acknowledgement information.

According to a 24th aspect, provided in addition to the fourteenth aspect, the base station determines, based on a priority of the UCI, the UCI transmission opportunity for receiving the UCI, wherein the UCI is a high-priority UCI having a higher priority than the acknowledgment information, the base station determines, based on a maximum deferral indication (k1+k1def) comprised in the SPS configuration, a target time interval for the target transmission opportunity, the target time interval being different from a repetitive time interval of the repetitive transmission opportunity, and the base station uses the target time interval for receiving the acknowledgment information.

In an optional implementation, thereof, the high-priority UCI is a scheduling request.

In a further optional implementation, thereof, the base station uses the repetitive transmission opportunity for receiving the UCI.

In a further optional implementation, thereof, at least one of the target time interval and the repetitive time interval is a slot or a mini-slot.

According to a 25th aspect, provided in addition to any one of the fourteenth to 24th aspect, the acknowledgement information comprises one or more hybrid automatic repeat request (HARQ) reports; and each of the HARQ reports is associated with downlink (DL) traffic of a certain HARQ process ID.

According to a 26th aspect, provided in addition to any one of the fourteenth to sixteenth aspects, if the base station determines, based on a maximum deferral indication (k1+k1def) comprised in the SPS configuration, that a target time interval for the target transmission opportunity is equal to a repetitive time interval of the repetitive transmission opportunity, the base station uses the target time interval of the target transmission opportunity for receiving the UCI and the base station does not receive a repetitive reception using the target transmission opportunity.

In an optional implementation, thereof, the base station uses the initial transmission opportunity for receiving, from the UE, the acknowledgment information.

In a further optional implementation, thereof, if the base station determines additionally that a physical uplink control channel, PUCCH, for the target transmission opportunity cannot be used for receiving the acknowledgment information multiplexed with the UCI, the base station uses the PUCCH for receiving the UCI.

According to a 27th aspect, a method is provided comprising the following steps performed by a UE:

determining, based on a Semi-Persistent Scheduling, SPS, configuration, an initial transmission opportunity and at least one repetitive transmission opportunity for an acknowledgement information;

determining a Uplink Control Information, UCI, transmission opportunity for transmitting UCI;

determining, if the UCI transmission opportunity is not available, a target transmission opportunity;

transmitting the acknowledgment information using the target transmission opportunity.

According to a 28th aspect, a method is provided comprising the following steps performed by a base station:

determining, based on a Semi-Persistent Scheduling, SPS, configuration, an initial transmission opportunity and at least one repetitive transmission opportunity for an acknowledgement information;

determining a Uplink Control Information, UCI, transmission opportunity for transmitting UCI;

determining, if the UCI transmission opportunity is not available, a target transmission opportunity;

receiving the acknowledgment information using the target transmission opportunity.

According to a 29th aspect, an integrated circuit is provided, which, in operation, controls a process of a user equipment, the process comprising the following steps performed by the user equipment:

determining, based on a Semi-Persistent Scheduling, SPS, configuration, an initial transmission opportunity and at least one repetitive transmission opportunity for an acknowledgement information;

determining a Uplink Control Information, UCI, transmission opportunity for transmitting UCI;

determining, if the UCI transmission opportunity is not available, a target transmission opportunity;

transmitting the acknowledgment information using the target transmission opportunity.

According to a 30th aspect, an integrated circuit is provided, which, in operation, controls a process of a base station, the process comprising the following steps performed by the base station:

determining, based on a Semi-Persistent Scheduling, SPS, configuration, an initial transmission opportunity and at least one repetitive transmission opportunity for an acknowledgement information;

determining a Uplink Control Information, UCI, transmission opportunity for transmitting UCI;

determining, if the UCI transmission opportunity is not available, a target transmission opportunity;

receiving the acknowledgment information using the target transmission opportunity.

Further Variants, including Hardware and Software Implementation of the present disclosure The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink.

The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH, PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slot subslots, minislots, or time resource units, such as symbols, Orthogonal Frequency Division Multiplexing (OFDM) symbols, Single Carrier-Frequency Division Multiplexing Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large delay compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE), comprising:
circuitry which, in operation:
determines, based on a Semi-Persistent Scheduling (SPS) configuration including a maximum deferral indication (k1+k1def), an initial transmission opportunity and at least one repetitive transmission opportunity for an acknowledgement information, the at least one repetitive transmission opportunity having a repetitive time interval;
determines a Uplink Control Information (UCI) transmission opportunity for transmitting UCI; and
determines, if the UCI transmission opportunity is not available, a target transmission opportunity having a target time interval which is based on the maximum deferral indication; and
a transceiver which, in operation, uses the target transmission opportunity having the target time interval for transmitting the acknowledgment information.

2. The UE according to claim 1, wherein
the UE determines, based on a second SPS configuration, the UCI transmission opportunity, wherein the UCI is additional acknowledgement information.

3. The UE according to claim 1, wherein
the UE determines that the UCI transmission opportunity is not available, if the at least one repetitive transmission opportunity overlaps with the UCI transmission opportunity.

4. The UE according to claim 1, wherein
the UE determines a physical uplink control channel (PUCCH) for the target transmission opportunity; and
the UE uses the PUCCH for transmitting the acknowledgment information multiplexed with the UCI.

5. The UE according to claim 4, wherein
the UE does not use the initial transmission opportunity for transmitting the acknowledgment information.

6. The UE according to claim 4, wherein
the UE uses the initial transmission opportunity for transmitting the acknowledgment information.

7. The UE according to claim 1, wherein
the target time interval is different from the repetitive time interval of the repetitive transmission opportunity;
the UE uses the repetitive transmission opportunity for transmitting the UCI; and
at least one of the target time interval and the repetitive time interval is a slot or a mini-slot.

8. The UE according to claim 7, wherein
the UE determines, based on the maximum deferral indication comprised in the SPS configuration, a second target time interval for the initial transmission opportunity, the second target time interval being different from the repetitive time interval and an initial time interval of the initial transmission opportunity;
the UE uses the second target time interval of the initial transmission opportunity for transmitting the acknowledgment information; and
at least one of the second target time interval and the initial time interval is a slot or a mini-slot.

9. The UE according to claim 1, wherein
the UE determines that the UCI transmission opportunity is not available if a symbol used for downlink overlaps with the UCI transmission opportunity.

10. The UE according to claim 1, wherein
the UE determines, based on a second SPS configuration, the UCI transmission opportunity, wherein the UCI is additional acknowledgement information;
the UE uses the repetitive transmission opportunity for retransmitting the initial acknowledgement information and transmitting the additional acknowledgement information;
the UE uses the target transmission opportunity for retransmitting the repetitive acknowledgement information and the additional acknowledgement information; and
the UE transmits the initial acknowledgement information at the initial transmission opportunity, and a counter for counting the repetitive transmission is restarted with retransmitting the initial acknowledgement information and transmitting the additional acknowledgement information.

11. The UE according to claim 1, wherein
the UE determines, based on a priority of the UCI, the UCI transmission opportunity for transmitting UCI, wherein the UCI is a high-priority UCI having a higher priority than the acknowledgment information;
the target time interval is different from the repetitive time interval of the repetitive transmission opportunity;
wherein the high-priority UCI is a scheduling request;
the UE uses the repetitive transmission opportunity for transmitting the UCI; and
wherein at least one of the target time interval and the repetitive time interval is a slot or a mini-slot.

12. The UE according to claim 1, wherein
the acknowledgement information comprises one or more hybrid automatic repeat request (HARQ) reports; and
each of the HARQ reports is associated with downlink (DL) traffic of a certain HARQ process ID.

13. The UE according to claim 1, wherein if the UE determines, based on the maximum deferral indication (k1+k1def) comprised in the SPS configuration, that the target time interval for the target transmission opportunity is equal to the repetitive time interval of the repetitive transmission opportunity, the UE uses the target time interval of the target transmission opportunity for transmitting the UCI and the UE drops the transmission of the acknowledgment information using the target transmission opportunity;

the UE uses the initial transmission opportunity for transmitting the acknowledgment information; and if the UE determines that a physical uplink control channel (PUCCH) for the target transmission opportunity cannot be used for transmitting the acknowledgment information multiplexed with the UCI, the UE uses the PUCCH for transmitting the UCI.

14. A base station comprising:

circuitry which, in operation:

determines, based on a Semi-Persistent Scheduling (SPS) configuration including a maximum deferral indication (k1+k1def), an initial transmission opportunity and at least one repetitive transmission opportunity for receiving, from a UE, an acknowledgement information, the at least one repetitive transmission opportunity having a repetitive time interval;

determines a Uplink Control Information (UCI) transmission opportunity for receiving, from the UE, UCI; and determines, if the UCI transmission opportunity is not available, a target transmission opportunity having a target time interval which is based on the maximum deferral indication;

a transceiver which, in operation, uses the target transmission opportunity having the target time interval for receiving, from the UE, the acknowledgment information.

15. The base station according to claim 14, wherein the base station determines, based on a second SPS configuration, the UCI transmission opportunity, wherein UCI is additional acknowledgement information.

16. The base station according to claim 14, wherein the base station determines that the UCI transmission opportunity is not available, if the at least one repetitive transmission opportunity overlaps with the UCI transmission opportunity.

17. The base station according to claim 14, wherein the base station determines a physical uplink control channel (PUCCH) for the target transmission opportunity; and the base station uses the PUCCH for receiving, from the UE, the acknowledgment information multiplexed with the UCI.

18. The base station according to claim 17, wherein the base station does not use the initial transmission opportunity for receiving, from the UE, the acknowledgment information.

19. The base station according to claim 17, wherein the base station uses the initial transmission opportunity for receiving, from the UE, the acknowledgment information.

20. The base station according to claim 14, wherein the target time interval is different from the repetitive time interval of the repetitive transmission opportunity;

the base station uses the repetitive transmission opportunity for receiving, from the UE, the UCI; and at least one of the target time interval and the repetitive time interval is a slot or a mini-slot.

* * * * *